United States Patent
Kalyanasundaram et al.

(10) Patent No.: US 10,991,130 B2
(45) Date of Patent: Apr. 27, 2021

(54) SYSTEMS AND METHODS FOR IMPLEMENTING A SENSOR BASED REAL TIME TRACKING SYSTEM

(71) Applicant: Verizon Patent and Licensing Inc., Arlington, VA (US)

(72) Inventors: Vaidyanathan Kalyanasundaram, Chennai (IN); Rajaraman Vaidyanathaswami, P.N Pudur (IN); Ashish Phutela, Hyderabad (IN); Venkata Sai Karun Gollapalli, Rangareddi (IN); Obulivijayaraj Obuli, Chennai (IN); Jayaraman J. Arumugam, Ram nagar south (IN); Anil Kumar, Basking Ridge, NJ (US)

(73) Assignee: Verizon Patent and Licensing inc., Basking Ridge, NJ (US)

( * ) Notice: Subject to any disclaimer, the term of this patent is extended or adjusted under 35 U.S.C. 154(b) by 22 days.

(21) Appl. No.: 16/525,164

(22) Filed: Jul. 29, 2019

(65) Prior Publication Data
US 2021/0035334 A1 Feb. 4, 2021

(51) Int. Cl.
*G06T 11/00* (2006.01)
*G06T 7/90* (2017.01)
*G06T 5/00* (2006.01)

(52) U.S. Cl.
CPC ............ *G06T 11/001* (2013.01); *G06T 5/004* (2013.01); *G06T 7/90* (2017.01); *G06T 2207/10048* (2013.01)

(58) Field of Classification Search
CPC ......... G06T 11/001; G06T 5/004; G06T 5/50; G06T 7/90; G06T 7/11; G06T 7/194;
(Continued)

(56) References Cited

U.S. PATENT DOCUMENTS 9,858,388 B1 * 1/2018 Ashoori ................. G16H 40/67
10,504,240 B1 * 12/2019 Solh ....................... H04N 9/045
(Continued)

OTHER PUBLICATIONS

"Robust detection of people in thermal imagery"; J.W. Davis, Proceedings of the 17th International Conference on Pattern Recognition, 2004. ICPR 2004. (vol. 4, pp. 713-716 vol.4) (Year: 2004).*

(Continued)

*Primary Examiner* — Michael S Osinski

(57) ABSTRACT

An exemplary system includes a memory that stores instructions and a processor communicatively coupled to the memory. The processor is configured to execute the instructions to access a thermal image captured by a thermal imaging device, the thermal image including a plurality of pixels, convert the thermal image to a heatmap image, generate a foreground image by separating a background represented in the heatmap image from a foreground represented in the heatmap image, identify, in the foreground image, at least one hotspot representing a heat source located at the user premises, determine a contour shape of the at least one hotspot, and determine, based on the contour shape of the at least one hotspot, whether the at least one hotspot represented in the foreground image represents a target heat source located at the user premises.

20 Claims, 15 Drawing Sheets
(2 of 15 Drawing Sheet(s) Filed in Color)

(58) Field of Classification Search
CPC ..... G06T 7/0012; G06T 7/215; G06T 7/0004; G06T 7/136; G06T 7/174; G06T 2207/10048; G06T 2207/10024; G06T 2207/20221; G06T 2207/30196; G06T 2207/10016; G06T 2207/30232; G06T 2207/10028; H04N 5/33; H04N 5/332; H04N 5/144; G06K 9/00355; G06K 9/00624; G06K 9/00805; G06K 9/4661; G06K 9/00268; G06K 9/00281; G06K 9/00288; G06K 9/00302; A61B 5/015; A61B 5/0013
See application file for complete search history.

(56) References Cited

U.S. PATENT DOCUMENTS

| | | | | |
|---|---|---|---|---|
| 10,803,595 | B2* | 10/2020 | Schulte | G06K 9/3241 |
| 10,839,659 | B2* | 11/2020 | Van Cleave | G06T 5/00 |
| 2003/0091228 | A1* | 5/2003 | Nagaoka | G06K 9/00805 |
| | | | | 382/154 |
| 2009/0324015 | A1* | 12/2009 | Way | G06K 9/4661 |
| | | | | 382/103 |
| 2010/0100275 | A1* | 4/2010 | Mian | B61L 1/20 |
| | | | | 701/31.4 |
| 2011/0164823 | A1* | 7/2011 | Park | G06T 7/12 |
| | | | | 382/199 |
| 2012/0147188 | A1* | 6/2012 | Yokochi | B60R 1/00 |
| | | | | 348/148 |
| 2012/0262583 | A1* | 10/2012 | Bernal | H04N 5/33 |
| | | | | 348/164 |
| 2012/0281878 | A1* | 11/2012 | Matsuda | G06T 7/75 |
| | | | | 382/103 |
| 2014/0036054 | A1* | 2/2014 | Zouridakis | A61B 5/0077 |
| | | | | 348/77 |
| 2014/0363089 | A1* | 12/2014 | Uetsuji | G06T 7/50 |
| | | | | 382/199 |
| 2015/0269740 | A1* | 9/2015 | Mazurenko | G06T 7/11 |
| | | | | 382/173 |
| 2015/0286859 | A1* | 10/2015 | Zaytsev | G06F 3/017 |
| | | | | 382/103 |
| 2016/0162746 | A1* | 6/2016 | Chen | G06T 7/11 |
| | | | | 382/128 |
| 2016/0292514 | A1* | 10/2016 | Robinson | G06K 9/2018 |
| 2017/0027450 | A1* | 2/2017 | Toledano | A61B 5/0048 |
| 2017/0355081 | A1* | 12/2017 | Fisher | H04N 5/33 |
| 2019/0065873 | A1* | 2/2019 | Wang | G06K 9/00845 |
| 2019/0213264 | A1* | 7/2019 | Antipa | G06K 9/00302 |
| 2019/0213411 | A1* | 7/2019 | Rajagopalan | H05B 47/105 |
| 2019/0279371 | A1* | 9/2019 | Usikov | G06K 9/6288 |
| 2019/0328238 | A1* | 10/2019 | Achilefu | G06T 7/0012 |
| 2020/0082551 | A1* | 3/2020 | Steiner | G01S 5/0294 |
| 2020/0296305 | A1* | 9/2020 | Weng | G06T 7/90 |
| 2020/0384689 | A1* | 12/2020 | Bautista Ballester | B29C 64/393 |

OTHER PUBLICATIONS

"Feature Enhancement Using Gradient Salience on Thermal Image"; Zelin Li, 2010 Digital Image Computing: Techniques and Applications (Year: 2010).*

* cited by examiner

US 10,991,130 B2

SYSTEMS AND METHODS FOR IMPLEMENTING A SENSOR BASED REAL TIME TRACKING SYSTEM

BACKGROUND INFORMATION

Attributes of an environment (e.g., a workplace environment such as an office environment) have a direct bearing on human comfort levels, well-being of individuals in the environment, and/or their productivity. Several environmental variables factor into how comfortable an environment is for an individual to occupy. One key environmental variable that affects the human comfort level in the environment is the heat index of the environment. The heat index corresponds to a combined measure of temperature and humidity of the environment. The heat index varies depending on the ambient temperature of the environment, the number of persons in the environment, and/or the presence of one or more non-human heat sources (e.g., printers, computers, televisions, etc.) located in the environment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Systems and methods for implementing a sensor based real time tracking system are described herein. For example, an exemplary system for detecting a heat source at a user premises may include a memory that stores instructions and a processor communicatively coupled to the memory. The processor is configured to execute the instructions to: access a thermal image captured by a thermal imaging device, the thermal image including a plurality of pixels, each pixel included in the plurality of pixels representing a geographic position at a user premises and having a value indicative of a temperature associated with the geographic position; convert the thermal image to a heatmap image; generate a foreground image by separating a background represented in the heatmap image from a foreground represented in the heatmap image; identify, in the foreground image, at least one hotspot representing a heat source located at the user premises; determine a contour shape of the at least one hotspot; and determine, based on the contour shape of the at least one hotspot, whether the at least one hotspot represented in the foreground image represents a target heat source located at the user premises.

Various advantages and benefits are associated with the systems and methods for detecting a heat source at a user premises described herein. For example, systems and methods such as those described herein transform a thermal image of a user premises into an image format that facilitates detecting location, movement, and/or the number of target heat sources (e.g., persons) at the user premises. Systems and methods such as those described herein are configured to use the image format to accurately and/or efficiently detect target heat sources at the user premises. In addition, information associated with the detected heat sources at a user premises may be used, for example, to determine a human comfort index associated with the user premises, monitor utilization of the user premises, manage energy consumption at the user premises, etc. These and other benefits that may be realized by systems and methods described herein will be evident from the disclosure that follows.

Figure 1:
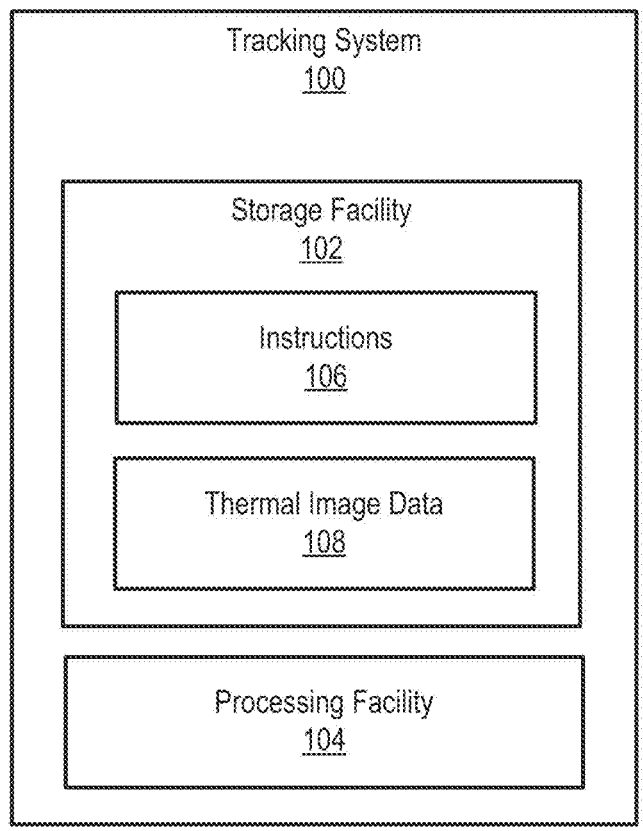
FIG. 1 illustrates an exemplary sensor based real time tracking system ("tracking system") according to principles described herein.

FIG. 1 illustrates an exemplary tracking system 100 ("system 100"). As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation.

Storage facility 102 may maintain (e.g., store) executable data used by processing facility 104 to perform any of the operations described herein. For example, storage facility 102 may store instructions 106 that may be executed by processing facility 104 to perform any of the operations described herein. Instructions 106 may be implemented by any suitable application, software, code, and/or other executable data instance.

Storage facility 102 may also maintain any data received, generated, managed, used, and/or transmitted by processing facility 104. For example, as shown, storage facility 102 may maintain thermal image data 108.

Thermal image data 108 may include any information associated with a thermal image of a user premises. Thermal image data 108 may include an initial thermal image (e.g., a raw thermal image) captured by a thermal imaging device, any processed version of the thermal image such as those described herein, and/or any other suitable data. Certain processed versions of a thermal image may be referred to herein as heatmap images. A heatmap image may be a graphical representation of the data in a thermal image where individual values (e.g., temperatures) for each pixel are represented by either colors or shades of gray. A heatmap image may generally refer to any one of various images that may be generated while performing image processing operations such as those described herein. As will be described in more detail herein, the heatmap images may be processed in any suitable manner to facilitate detecting a heat source at a user premises. Exemplary heatmap images are described herein.

Storage facility 102 may store any other suitable data as may serve a particular implementation. For example, storage facility 102 may store any suitable data (e.g., environmental information (e.g., temperature, light, humidity, etc.), floor plan information, network device location information, etc.) associated with a user premises. As used herein, a "user premises" may correspond to any indoor location and/or outdoor location where it may be desirable to detect heat sources. In certain examples, a user premises may include a home, an office building, a government building, a school, a manufacturing facility, a retail location, and/or any other suitable structure or outdoor space associated with such structures where it may be desirable to detect heat sources.

Processing facility 104 may be configured to perform (e.g., execute instructions 106 stored in storage facility 102 to perform) various processing operations associated with detecting a heat source at a user premises. For example, processing facility 104 may access a thermal image captured by a thermal imaging device and convert the thermal image to a heatmap image. Processing facility 104 may perform various operations (e.g., sequentially ordered image processing operations), such as those described herein, on the heatmap image to determine whether a heat source located at the user premises corresponds to a target heat source. These and other operations that may be performed by processing facility 104 are described herein.

Figure 2:
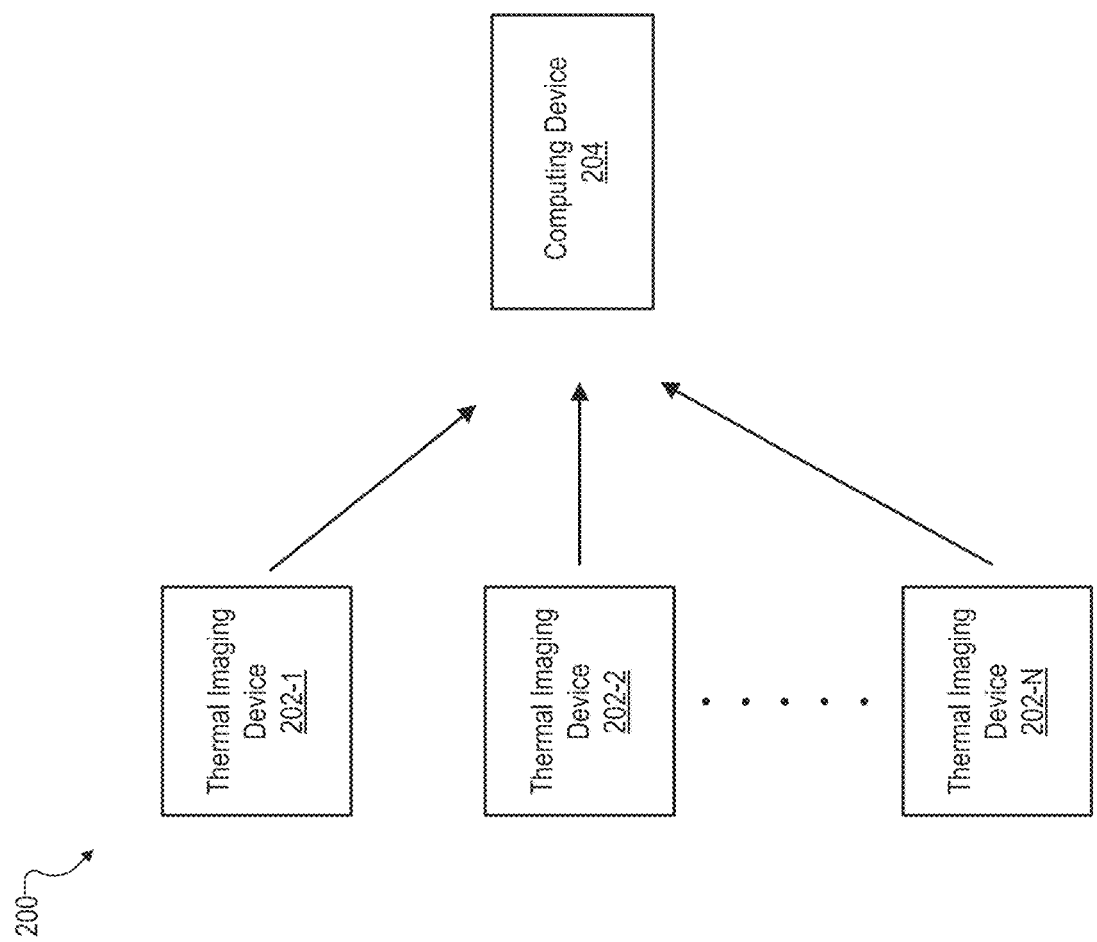
FIG. 2 illustrates an exemplary configuration within which the tracking system of FIG. 1 may operate according to principles described herein.

FIG. 2 shows an exemplary configuration 200 in which system 100 may be implemented. As shown in FIG. 2, configuration 200 includes a plurality of thermal imaging devices 202 (e.g., thermal imaging devices 202-1 through 202-N) that are communicatively connected to a computing device 204.

Thermal imaging devices 202 are configured to capture a thermal image of a user premises. To that end, thermal imaging devices 202 may include any suitable device or combination of devices that are configured to measure temperature from a distance and generate a thermal image of a user premises. As used herein, a "thermal image" corresponds to an image captured of a user premises that includes a plurality of pixels with each pixel included in the plurality of pixels representing a geographic position at the user premises. In addition, each pixel included in the plurality of pixels has a value indicative of a measured temperature associated with the geographic position.

In certain examples, thermal imaging devices 202 may include a first type of thermal imaging device and a second type of thermal imaging device different from the first type of thermal imaging device. For example, thermal imaging device 202-1 may include both a thermal pixel array camera and an individual thermal sensor configured to detect ambient temperature. The first type of thermal imaging device may operate using different physical principles than the second type of thermal imaging device. In addition, the first type of thermal imaging device and the second type of thermal imaging device may be adjusted separately for different sensitivity levels.

Thermal imaging devices 202 may be configured in any suitable way relative to a user premises. For example, thermal imaging devices 202 may be deployed in any suitable orientation and/or at any suitable location in relation to a user premises to facilitate detecting heat sources at the user premises. In certain examples, thermal imaging devices 202 may be provided above a user premises (e.g., on a ceiling of a room of a user premises) and may be directed downward to capture a thermal image of the user premises. In such examples, thermal imaging devices 202 may be configured to capture a thermal image plan view of the user premises.

In certain examples, one of thermal imaging devices 202 may be provided in each room of a user premises. For example, thermal imaging device 202-1 may be provided in a first room of the user premises, thermal imaging device 202-2 may be provided in a second room of the user premises, etc. Alternatively, more than one thermal imaging device 202 may be provided in a given room at a user premises. For example, an array of thermal imaging devices 202 may be deployed in a room of a user premises.

Thermal imaging devices 202 may capture thermal images in any suitable manner. For example, thermal imaging devices may capture thermal images at predefined times, during predefined time periods, periodically, or continuously. In addition, thermal imaging devices 202 may capture the thermal images at any suitable capture rate as may serve a particular implementation. For example, thermal imaging devices 202 may capture four thermal image frames per second in certain examples.

Thermal imaging devices 202 may be configured to capture any suitable resolution of thermal image as may serve a particular implementation. In certain examples, thermal imaging devices 202 may be configured to capture a low resolution thermal image of a user premises. For example, each thermal imaging device 202 may be configured to capture a 32×24 resolution image of the user premises, which results in a thermal image having 768 pixels.

In certain alternative implementations, each thermal imaging device 202 may be configured to capture a high resolution thermal image of a user premises. For example, thermal imaging devices 202 may include a high resolution thermal image camera having a 640×480 detector, which delivers a thermal image having 307,200 pixels.

Thermal imaging devices 202 may each include hardware and/or software components (e.g., processors, memories, communication interfaces, instructions stored in memory for execution by the processors, etc.) to facilitate capturing thermal images and/or communicating with computing device 204.

Thermal imaging devices 202 may be communicatively coupled to computing device 204 in any suitable manner. For example, thermal imaging devices 202 and computing device 204 may be communicatively coupled by any suitable wired or wireless communication interface. To this end, thermal imaging devices 202 and computing device 204 may each include one or more wired or wireless communication interfaces, such as one or more local area network interfaces, Wi-Fi network interfaces, cellular interfaces, etc. In certain examples, thermal imaging devices 202 may each include a dedicated microcontroller configured to operate a secure Wi-Fi communication link to communicate with computing device 204.

Computing device 204 may be configured to receive thermal image data (e.g., thermal image data 108) from thermal imaging devices 202. In certain examples, computing device 204 may store the thermal image data, process the thermal image data, and/or transmit the thermal image data to another device in any suitable manner and at any suitable time. In certain examples, computing device 204 may be configured to perform one or more of the operations on thermal image data accessed from thermal imaging devices 202, such as one or more of the operations described herein to detect, from the thermal image data, one or more heat sources located at a user premises.

In certain examples, computing device 204 may be configured to perform one or more processes on the thermal image data. For example, computing device 204 may analyze the thermal image data and/or other data associated with a user premises to generate analytics data and/or inferences associated with the user premises. As will be described herein, such analytics data and/or inferences may be used, for example, to optimize usage of a user premises, improve a human comfort level at the user premises, and/or for any other suitable purpose.

To facilitate processing of thermal image data to detect of one or more heat sources located at a user premises, system 100 may be incorporated in any one of thermal imaging devices 202 and computing device 204. Alternatively, system 100 may be distributed across thermal imaging devices 202 and computing device 204 in any suitable manner. Accordingly, system 100 may be configured to access a thermal image captured by one or more thermal imaging devices (e.g., thermal imaging device 202-1). System 100 may access a thermal image captured by thermal imaging devices 202 at any suitable time and in any suitable manner. For example, system 100 may access thermal images periodically, at predetermined times, or in a continuous stream of thermal images from thermal imaging devices 202.

System 100 (e.g., processor 104) may be configured to operate on accessed thermal imaging data (e.g., by sequentially performing ordered image processing operations on the thermal image data) to facilitate detecting heat sources at a user premises. Exemplary image processing operations that may be performed by system 100 on thermal image data will now be described in additional detail.

Figure 3:
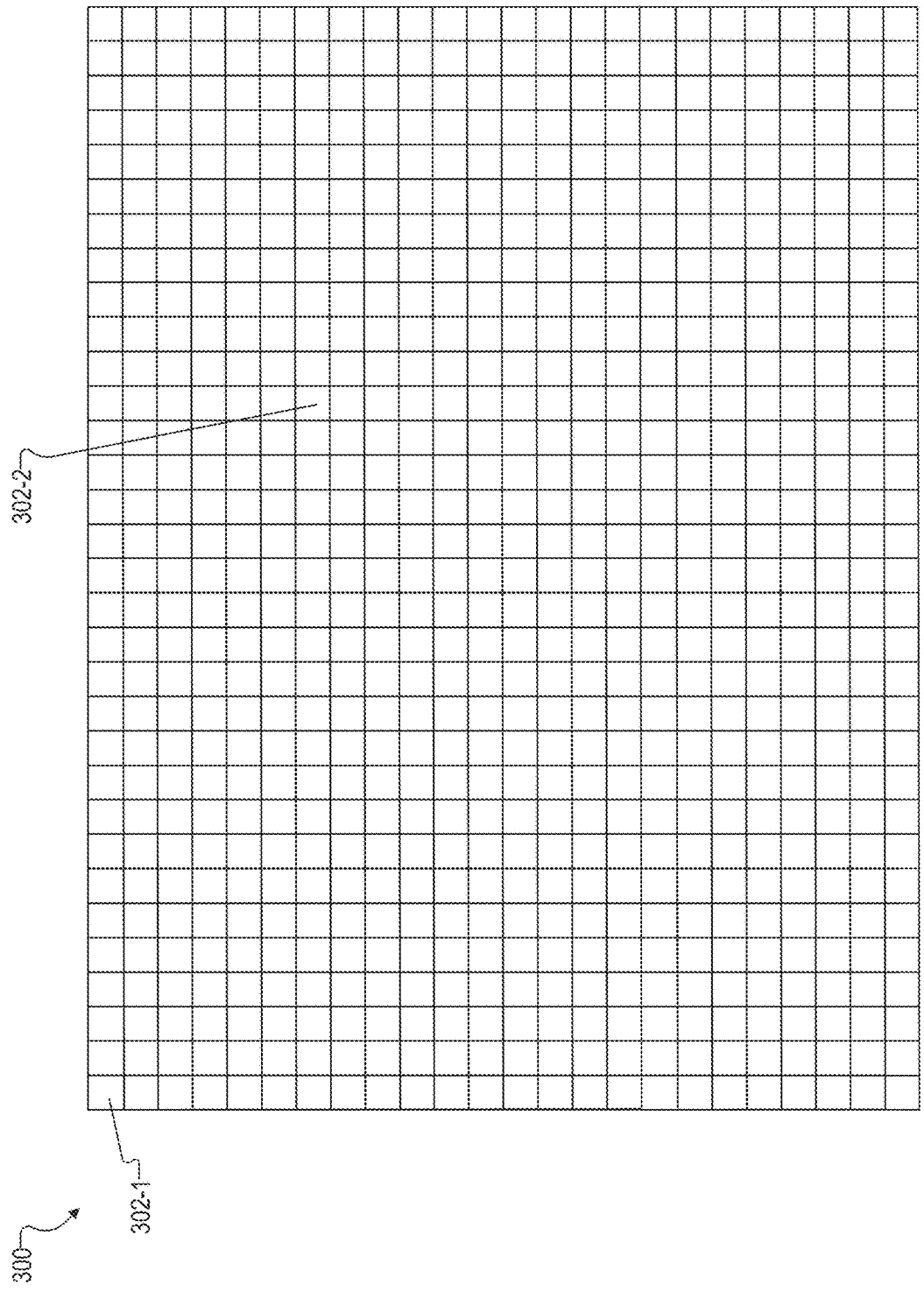
FIG. 3 illustrates an exemplary thermal image that may be captured by a thermal imaging device according to principles described herein.

FIG. 3 shows an exemplary thermal image 300 that may be captured at a particular time by one of thermal imaging devices 202. As shown in FIG. 3, thermal image 300 includes a plurality of pixels 302 (e.g., pixels 302-1, 302-2, etc.). In the example shown in FIG. 3, thermal image 300 corresponds to a plan view thermal image of, for example, a room at the user premises, and each pixel 302 in thermal image 300 is mapped to particular x and y coordinates in the room. In addition, each of pixels 302 has a value indicative of a temperature that a particular geographic location at the user premises has at a particular time. As such, pixel 302-1 may have a particular value (e.g., a value of 57), indicating that the particular corner of the room associated with pixel 302-1 has a particular temperature (e.g., a temperature of 57° F.). Pixel 302-2, on the other hand, may have a different value (e.g., a value of 98), indicating that the portion of the room associated with pixel 302-2 has a different temperature (e.g., a temperature of 98° F., which may indicate that a heat source such as a person is located at that portion of the room). In the example shown in FIG. 3, thermal image 300 includes 768 total pixels. However, it is understood that thermal image 300 may have any suitable number of pixels as may serve a particular implementation. The number of pixels included in a thermal image may depend on the resolution capabilities of thermal imaging devices 202.

After system 100 accesses a thermal image (e.g., thermal image 300), system 100 may convert the thermal image to a heatmap image. As mentioned, a heatmap image may correspond to any of a plurality of different images (e.g., a false color image, a grayscale image, etc.) that may be generated by system 100 while performing image processing operations such as those described herein. Exemplary heatmap images are described herein.

After system 100 converts the thermal image to a heatmap image, system 100 may generate a foreground image by separating a background represented in the heatmap image from a foreground represented in the heatmap image. As used herein, a "background" represents portions of the heatmap image that do not include a heat source. For example, if the thermal image is of a room in a shared office space, the background in the heatmap image may include desks, cubicles, chairs, the floor, etc. As used herein, a "foreground" represents portions of the heatmap image that include a heat source (e.g., a person and/or any other object that generates heat).

System 100 may separate the background represented in a heatmap image from the foreground represented in the heatmap image in any suitable manner. In certain examples, system 100 may generate the foreground image by executing one or more of a plurality of separation algorithms to separate the foreground from the background. Exemplary separation algorithms may include a binary thresholding algorithm, a Gaussian mixture model algorithm, and an Otsu thresholding algorithm. In certain examples, system 100 may select an image formed as a result of executing at least one of such separation algorithms to use as the foreground image. For example, system 100 may perform each of the exemplary separation algorithms described herein either concurrently or successively to generate a plurality of foreground images. System 100 may analyze the foreground images generated as a result of executing each separation algorithm to determine which separation algorithm results in the best separation of the background from the foreground. System 100 may then select one image included in the plurality of foreground images to use as the foreground image.

After system 100 generates the foreground image, system 100 may identify, in the foreground image, one or more hotspots representing one or more heat sources located at a user premises. As used herein, a "hotspot" refers to a portion of a heatmap image where the relatively highest temperatures are represented. In certain examples, multiple hotspots may represent a single heat source. For example, a head, a torso, and a hand of a person may each be represented in a heatmap image as separate and distinct hotspots. In such examples, system 100 may be configured to combine the plurality of hotspots represented in the foreground image in any suitable manner to form a single hotspot that is representative of the person. In combining hotspots, system 100 may perform a morphological transformation so as to remove holes in the foreground image and sharpen outlines of hotspots. Such a morphological transformation may be performed in any suitable manner.

After system 100 identifies one or more hotspots, system 100 may be configured to determine a contour shape of each of the hotspots represented in the foreground image. System 100 may determine the contour shape in any suitable manner. For example, system 100 may trace an outline of a hotspot in any suitable manner and use the traced outline as the contour shape of the hotspot. Exemplary contour shapes of hotspots are described herein.

Based on the contour shape of a hotspot, system 100 may determine whether a hotspot represents a target heat source located at the user premises. In certain examples, a target heat source may correspond to a person at the user premises. System 100 may determine whether a hotspot corresponds to a target heat source in any suitable manner. For example, system 100 may access a database that includes known contour shapes that have been identified as representing a target heat source such as a person. System 100 may then compare the known contour shapes with the contour shapes of hotspots to determine whether the contour shapes of the hotspots match any of the known contour shapes. Based on such a comparison, system 100 may determine, for example, that a hotspot represents a person at the user premises. Based on such a determination, system 100 may further determine how many persons are currently located at the user premises.

In certain examples, it may be desirable to calibrate a thermal image (e.g., thermal image 300) captured by thermal imaging devices 202 prior to system 100 performing image processing operations such as those described herein. Such calibration may be helpful at least because thermal images accessed by system 100 may be affected by the ambient temperature at a user premises. For example, if the ambient temperature at the user premises is high relative to a heat source at the user premises, the data represented in the thermal image may appear washed out. On the other hand, if the ambient temperature is low relative to a heat source at the user premises, the heat source may be represented in a heatmap image as a dazzling object of thermal radiation. In each instance, the ambient temperature may make it difficult to detect a heat source at the user premises. Accordingly, in certain examples, system 100 may be configured to calibrate, based on the ambient temperature at the user premises, a thermal image captured by thermal imaging devices 202. This calibration may be performed in any suitable manner to normalize contrast between a background represented in the thermal image and a foreground represented in the thermal image.

System 100 may determine the ambient temperature to be used in calibrating a thermal image in any suitable manner. In certain examples, thermal imaging devices 202 may include one or more thermal sensors configured to detect ambient temperature. Additionally or alternatively, system 100 may be communicatively connected to a heating, ventilation, and air conditioning ("HVAC") system at the user premises and may determine the ambient temperature by way of a thermal sensor that is included as part of the HVAC system.

In certain examples, thermal imaging devices 202 may calibrate thermal images after the thermal images are captured. For example, thermal imaging device 202-1 may automatically calibrate each thermal image captured by thermal imaging device 202-1. In such examples, image processing operations performed by system 100 may at least partially be implemented by thermal imaging devices 202.

In certain examples, when system 100 converts a thermal image to a heatmap image, system 100 may perform a plurality of intermediate conversions in which different types of heatmap images may be generated. Exemplary different types of heatmap images that may be generated in certain examples will now be described with reference to FIGS. 4-7.

Figure 4:
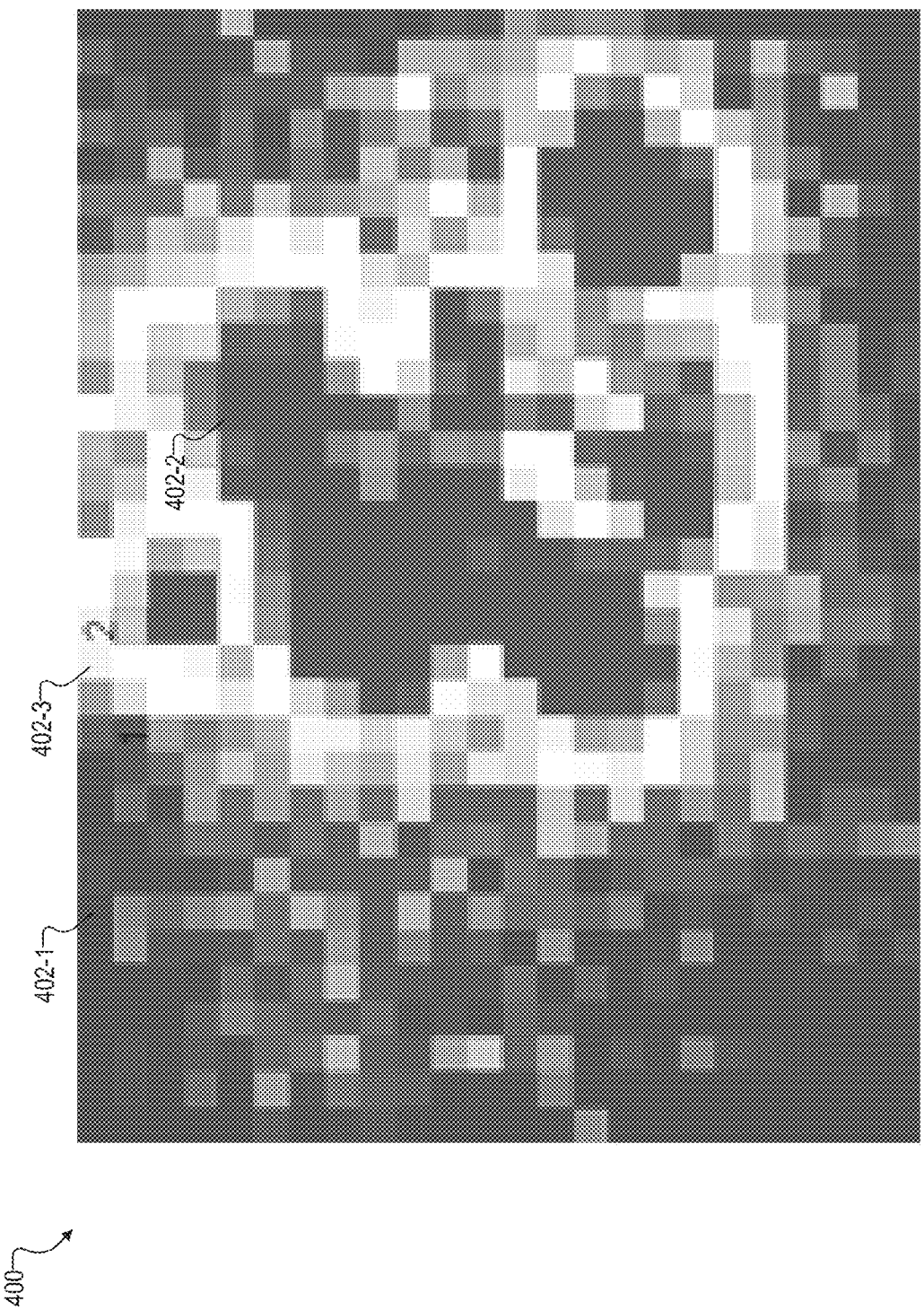
FIGS. 4-7 illustrate various exemplary heatmap images at different stages of image processing according to principles described herein.

In certain examples, system 100 may convert a thermal image to a heatmap image by first converting the thermal image to a false color image. In a false color image, the temperature associated with each geographic position at a user premises is represented by a color selected from a plurality of colors. To illustrate, FIG. 4 shows an exemplary false color image 400 that may be generated by system 100 in certain implementations. As shown in FIG. 4, the colors red, white, and blue are used to represent temperature in false color image 400. In the example shown in FIG. 4, the color red is provided to show relatively warmer areas of the user premises whereas the color blue is provided to show relatively cooler areas of the user premises. The color white is provided to show intermediate temperature areas. For example, pixel 402-1 is blue in FIG. 4 indicating that the geographic position associated with pixel 402-1 is relatively cold. In this example, pixel 402-1 may be considered as part of a background of false color image 400. On the other hand, pixel 402-2 is red in FIG. 4, indicating that the geographic position associated with pixel 402-2 is relatively warm, and may correspond to a location of a person at the user premises. As such, pixel 402-2 may be considered as part of a foreground of false color image 400. Pixel 402-3 has a white/light blue color indicating that the geographic position associated with pixel 402-3 has a temperature that is somewhere between the temperatures associated with pixels 402-1 and 402-2. Although false color image 400 uses the colors blue, white, and red, it is understood that any suitable color palette may be selected to generate a false color image as may serve a particular implementation. In certain examples, the palette for the false color image may be selected to ensure a maximum contrast and dynamic range in the thermal image.

In certain examples, thermal imaging devices 202 may perform the operation to convert a thermal image to a false color image. For example, thermal imaging device 202-1 may automatically convert a thermal image to a false color image after capture. In certain examples, conversion of a thermal image to a false color image may be performed after the thermal image has been calibrated by thermal imaging device 202-1. Thermal imaging device 202-1 may then perform further processing on the false color image or may transmit the false color image to another device (e.g., computing device 204) for further processing. In other examples, thermal imaging devices 202 may transmit data representative of a raw thermal image to computing device 204, which may calibrate and convert the thermal image to a false color image. In other examples, thermal imaging devices 202 may calibrate a thermal image and transmit data representing the calibrated thermal image to computing device 204, which may convert the calibrated thermal image to a false color image.

In certain examples, system 100 may be configured to increase resolution of the false color image. This may be particularly useful when thermal imaging devices 202 are configured to capture relatively low resolution thermal images. System 100 may increase the resolution of a false color image by any suitable amount. For example, if the false color image has an initial resolution of 32×24, system 100 may increase the resolution to 640×480 in certain implementations.

System 100 may increase the resolution of the false color image in any suitable manner. For example, system 100 may execute any one or more interpolation algorithms to increase the resolution of the false color image. Exemplary interpolation algorithms that may be used by system 100 to increase resolution of a false color image may include, for example, a bilinear interpolation algorithm, a bicubic interpolation algorithm, a Lanczoz interpolation algorithm, a Bessel interpolation algorithm, etc.

Figure 5:

In certain examples, the converting of the thermal image by system 100 to a heatmap image may further include converting a false color image (e.g., false color image 400) to a Hue, Saturation, Value ("HSV") image. An HSV image may facilitate accurate and/or efficient separation of a background of the image from a foreground of the image. FIG. 5 shows an exemplary HSV image 500 that may be generated by system 100 converting false color image 400 to an HSV image.

In certain examples, system 100 may perform a rough separation operation on an HSV image to separate a background in the HSV image from a foreground in the HSV image. Such a separation may be performed in any suitable manner. For example, system 100 may use thresholding to determine whether a particular pixel in the HSV image is background or foreground. If a particular pixel in the HSV image has a value between a certain range of values, the pixel may be considered as foreground. On the other hand, if a particular pixel has a value between a different range of values, the pixel may be considered as background. System 100 may exclude any pixels that system 100 determines are in the background such that only foreground pixels are represented in the HSV image. In such examples, the resulting HSV image may be considered as a foreground HSV image.

After system 100 generates the HSV image, system 100 may convert the HSV image (e.g., either the full HSV image or a foreground HSV image) to a grayscale image to facilitate further processing. In a grayscale image, different shades of gray are indicative of different temperatures at the user premises. System 100 may convert an HSV image to a grayscale image in any suitable manner. For example, system 100 may determine the shade of gray to use for each pixel included in the HSV image based on the "value" attribute associated with each pixel in the HSV image. By converting the HSV image to a grayscale image it is possible to more easily perform further fine-grained image processing operations on the thermal image data than is possible with an HSV image.

Figure 6:
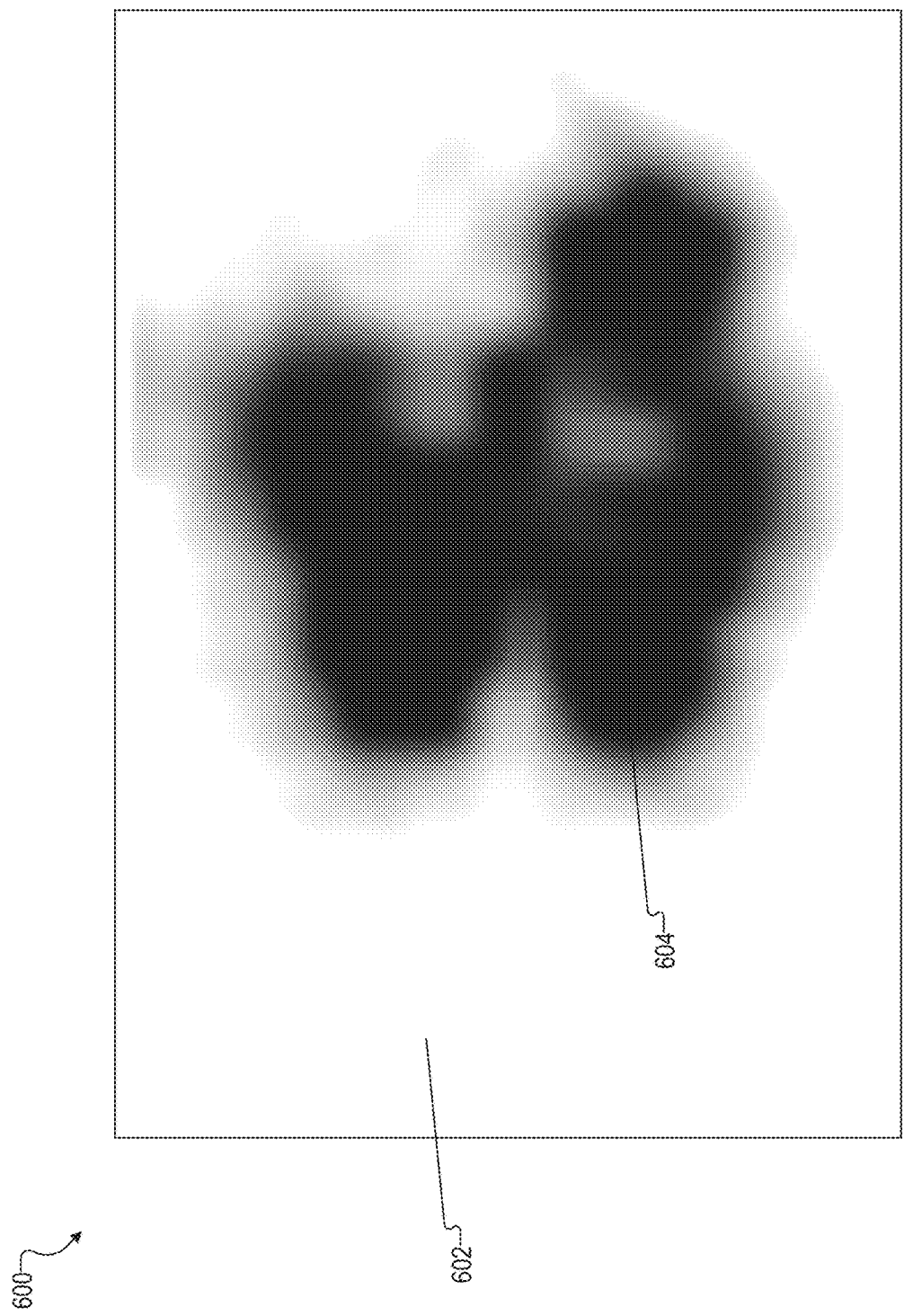

As part of such further fine-grained image processing operations that may be associated with a grayscale image, system 100 may be configured to generate a foreground image by separating a background represented in the grayscale image from a foreground represented in the grayscale image. FIG. 6 shows an exemplary grayscale image 600 that may be generated from HSV image 500 shown in FIG. 5. As shown in FIG. 6, grayscale image 600 includes a background 602, which may include any object and/or portion of the user premises that does not include a heat source, and a foreground 604, which includes one or more heat sources at the user premises. In the example shown in FIG. 6, system 100 may generate a foreground image by excluding any pixels in background 602 (including the lighter shaded areas around foreground 604) such that only the black areas (e.g., the hotspots) in foreground 604 are included in the foreground image.

System 100 may perform any suitable additional image processing operations with respect to a grayscale image before and/or after system 100 generates a foreground image from the grayscale image. In certain examples, system 100 may be configured to adjust at least one of an intensity and contrast of a grayscale image. The adjusting of the intensity and/or contrast of the grayscale image may facilitate compensating for ambient temperature variations at the user premises. In addition, the adjusting of the intensity and/or contrast of the grayscale image may reduce gradual tonal gradations at a periphery of hotspots represented in the grayscale image. System 100 may adjust the intensity and/or contrast of a grayscale image in any suitable manner.

Additionally or alternatively, system 100 may be configured to perform an image blurring operation on a grayscale image (e.g., grayscale image 600 and/or a foreground image generated from grayscale image 600). Such an image blurring operation may be helpful to reduce grains and/or pepper and salt noise in the grayscale image. System 100 may perform the image blurring operation in any suitable manner as may serve a particular implementation. For example, system 100 may utilize a filter such as a Gaussian smoothing filter to reduce noise in the grayscale image.

Additionally or alternatively, system 100 may be configured to perform a morphological transformation operation on a grayscale image (e.g., grayscale image 600 and/or a foreground image generated from grayscale image 600) to reduce holes in the grayscale image and/or sharpen outlines of hotspots represented in the grayscale image. System 100 may perform the morphological transformation operation in any suitable manner. For example, the morphological transformation operation may include an erosion operation where boundaries of regions (e.g., hotspots) represented in a grayscale image shrink in size such that holes around those regions become larger. Additionally or alternatively, the morphological transformation operation may include a dilation operation where boundaries of regions (e.g., hotspots) represented in a grayscale image grow in size while holes around those regions become smaller.

Figure 7:
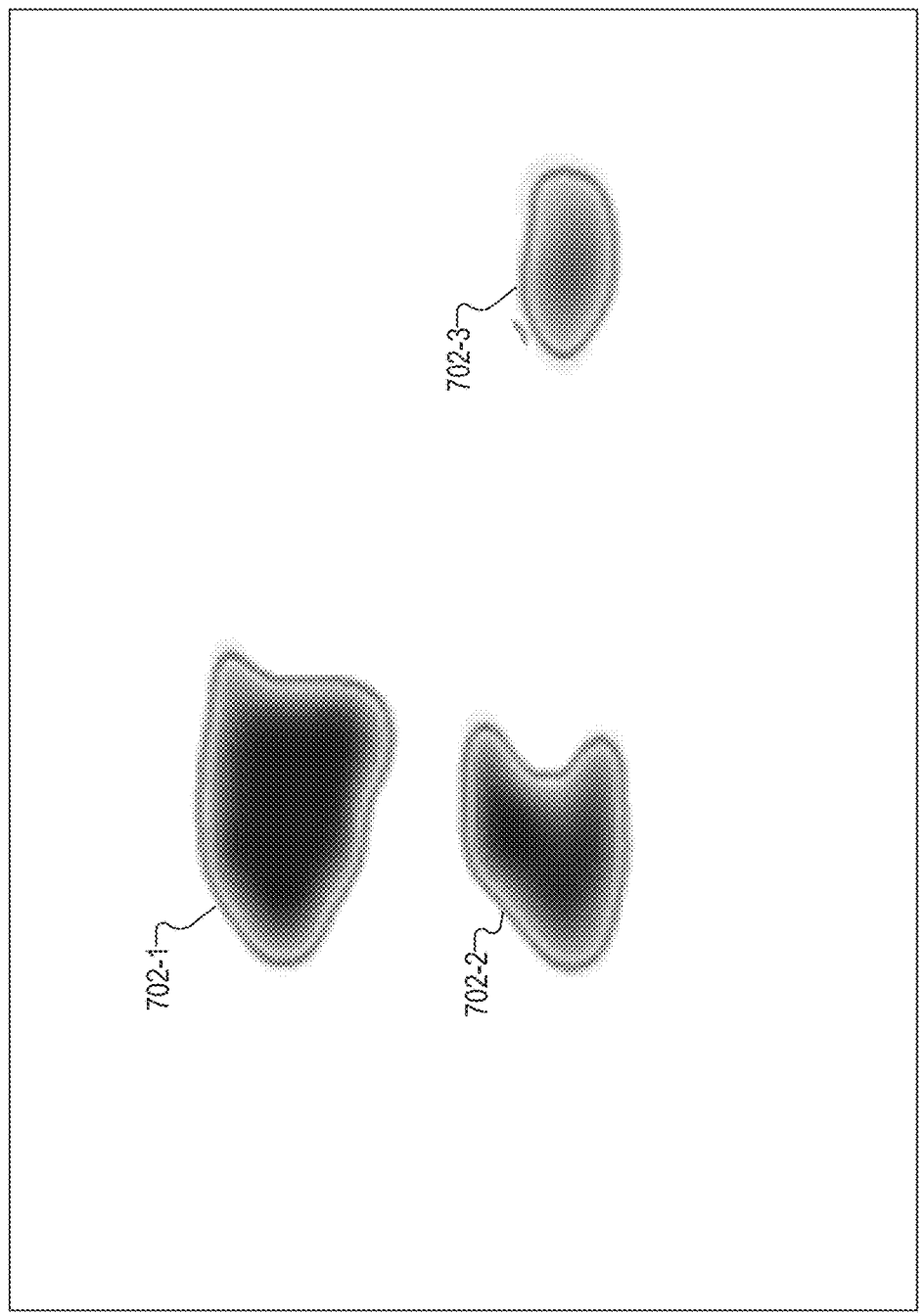

FIG. 7 shows an exemplary image 700 that may be generated by system 100 performing various image processing operations such as those described herein on grayscale image 600 shown in FIG. 6. As shown in FIG. 7, image 700 includes a plurality of hotspots 702 (e.g., hotspots 702-1 through 702-3) that represent heat sources at the user premises. Hotspots 702 shown in FIG. 7 are reduced in size and have sharper outlines than corresponding regions in grayscale image 600, which changes may be attributed, for example, to a morphological transformation operation, an image blurring operation, etc. being performed on grayscale image 600 and/or a foreground image of grayscale image 600.

After system 100 performs image processing operations associated with a foreground image, system 100 is configured to determine a contour shape of each hotspot represented in the foreground image. As mentioned, system 100 may determine the contour shape of each hotspot by tracing an outline of each hotspot in any suitable manner. To illustrate, each hotspot 702 shown in FIG. 7 includes a traced outline around an outer periphery of the relatively darker regions representing hotspots 702. In certain examples, system 100 may only consider the shape defined by the traced outline when determining the contour shape of a hotspot.

System 100 may analyze the contour shapes of each hotspot represented in a foreground image in any suitable manner and make any suitable inference associated with the contour shapes. For example, system 100 may analyze image 700 shown in FIG. 7 and determine, based on the contour shapes of hotspots 702, whether hotspots 702 represent target heat sources (e.g., persons) at the user premises. Based on such analysis, system 100 may determine that hotspots 702-1, 702-2, and 702-3 each represent a person at the user premises. Alternatively, system 100 may analyze image 700 and determine, for example, that hotspots 702-1 and 702-2 each represent persons at the user premises and that hotspot 702-3 represents a non-human heat source at the user premises.

In certain examples, system 100 may be further configured to disregard one or more hotspots represented in a foreground image that do not represent a target heat source. This may be accomplished in any suitable manner. For example, system 100 may determine a location of a hotspot in relation to the user premises. After system 100 determines the location of the hotspot, system 100 may access a database that includes information identifying one or more non-human heat sources located at the user premises, a contour shape of each of the one or more non-human heat sources, and a location of each of the one or more non-human heat sources at the user premises. In certain examples, such information included in the database may be represented in a heatspot map of a user premises. Such a heatspot map may include locations of non-human heat sources (e.g., printers, televisions, space heaters, etc.).

System 100 may determine that a particular hotspot represented in a foreground image represents a non-human heat source when a contour shape of the particular hotspot matches a contour shape of a non-human heat source included in the database and when a location of the particular hotspot matches the location of the non-human heat source at the user premises included in the database. When system 100 determines that the particular hotspot represents a non-human heat source, system 100 may either exclude the particular hotspot from the foreground image or disregard the particular hotspot when analyzing the foreground image. To illustrate an example, system 100 may determine, based on a location and contour shape of hotspot 702-3 shown in FIG. 7, that hotspot 702-3 corresponds to a printer located at the user premises. Accordingly, system 100 may disregard hotspot 702-3 when determining, for example, how many people are currently located at the user premises.

In certain examples, it may be difficult to accurately and/or efficiently identify specific heat sources from a thermal image, such as people located in a user premises, especially in an office environment where people move around and/or there are multiple other sources of heat. Such movement of persons within a user premises may result in overestimating the number of persons currently located at a user premises. For example, when a person moves from a first location to a second location within the user premises, there may be residual heat for a certain amount of time at the first location. As such, the first location and the second location may each appear as hotspots in a heatmap image even though there is only one person associated with the two locations.

Figure 8:
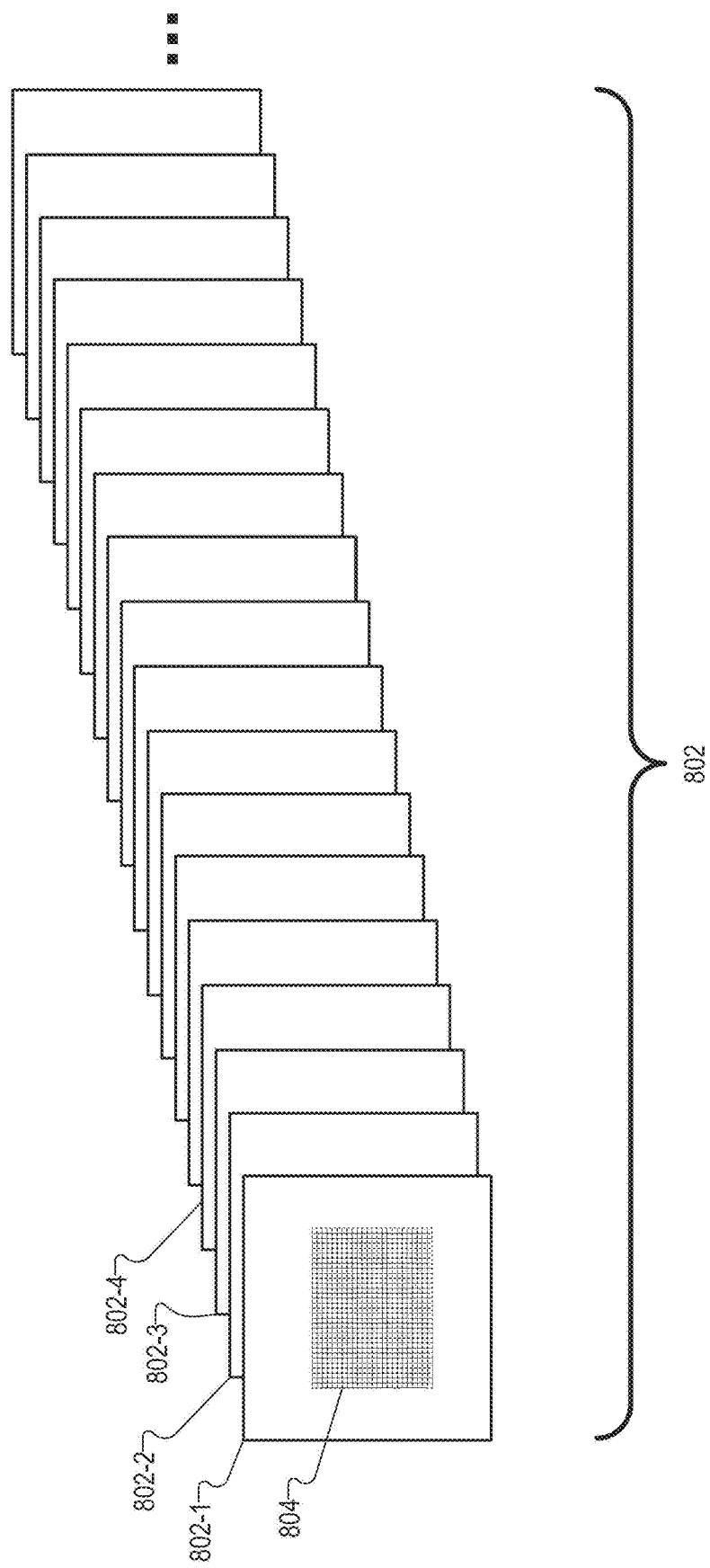
FIG. 8 illustrates a plurality of thermal image frames that may be sequentially captured by a thermal imaging device and processed according to principles described herein.

To facilitate providing an accurate determination of the number of persons currently at a user premises, system 100 may process a plurality of thermal images associated with the user premises. To illustrate, FIG. 8 shows a plurality of thermal image frames (e.g., thermal image frames 802-1, 802-2, 802-3, 802-4, etc.) that may be captured by a thermal imaging device (e.g., thermal imaging device 202-1) located at a user premises. As shown in FIG. 8, each thermal image frame included in plurality of thermal image frames 802 includes a thermal image 804.

System 100 may process additional thermal images (e.g., thermal images 804) in any suitable manner, such as described herein, to generate additional foreground images. System 100 may then compare a foreground image to an additional foreground image to determine whether a hotspot represented in the additional foreground image represents a target heat source at the user premises. For example, system 100 may determine that the hotspot in the additional foreground image represents the target heat source if the hotspot in the additional foreground image is in the same location or is within a predetermined distance from the hotspot in the foreground image.

In certain examples, system 100 may use a running average to approximate the number of persons currently located at the user premises at a given time. System 100 may use any suitable subset of thermal image frames to determine the running average as may serve a particular implementation. For example, system 100 may add up the number of persons determined to be located at the user premises in each of thermal image frames 802-1 through 802-3. System 100 may then divide that value by three to determine the average associated with thermal image frames 802-1 through 802-3. Next, system 100 may add up the number of persons determined to be located at the user premises in each of thermal image frames 802-2 through 802-4. System 100 may then divide that value by three to determine the average associated with thermal image frames 802-2 through 802-4. In so doing, system 100 may generate a running average across different subsets of thermal image frames 802 to accurately determine the number of persons currently located at a user premises.

It is understood that, in certain examples, image processing operations such as those described herein may be performed in a predefined order. In certain alternative examples, the order in which at least some image processing operations such as those described herein are performed may change depending on a particular implementation. In addition, at least some image processing operations such as those described herein may be performed sequentially or in parallel (e.g., concurrently) with other image processing operations. Further, it is understood that some of the exemplary image processing operations described herein may be omitted in certain examples.

Figure 9:
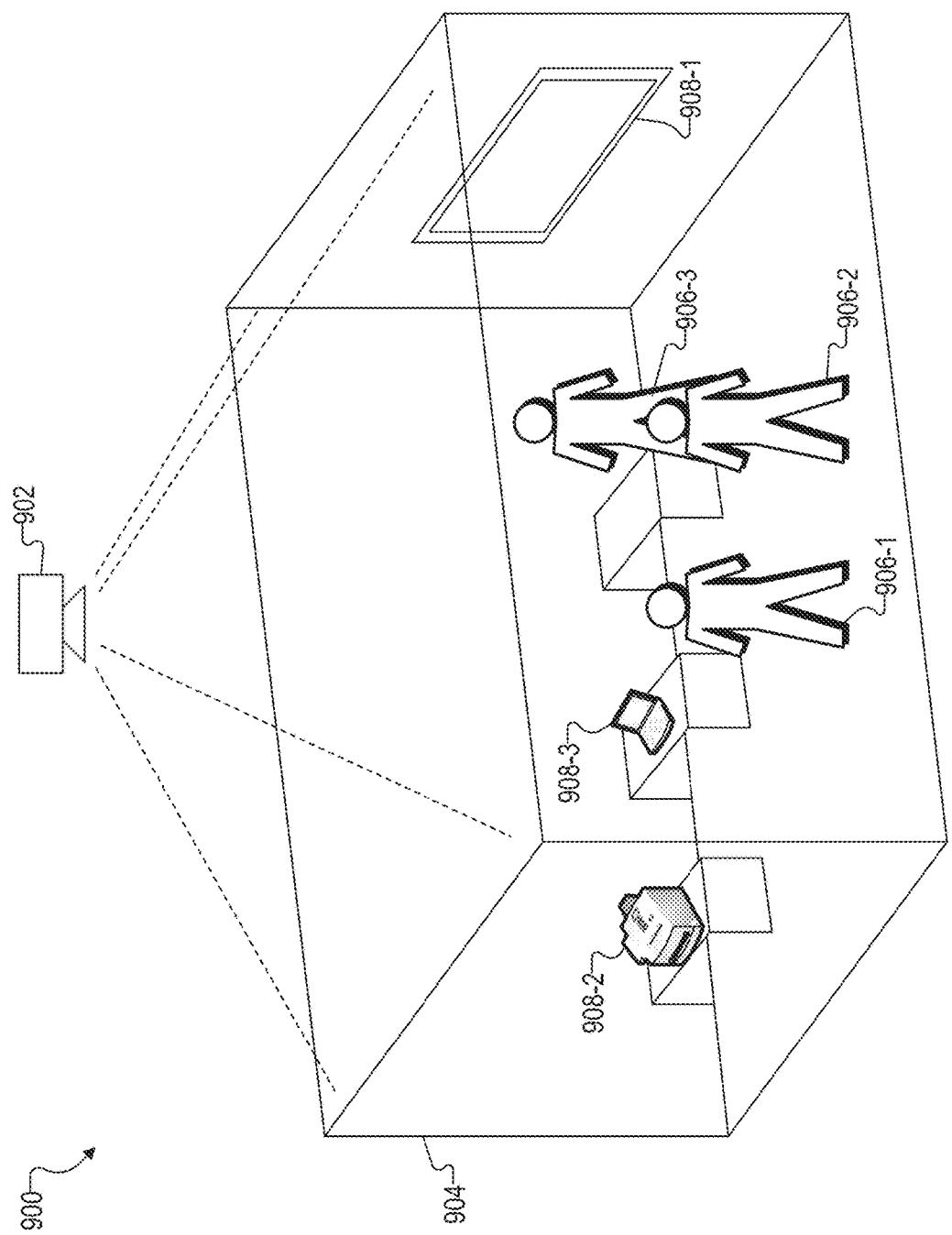
FIG. 9 illustrates an exemplary room of a user premises in which heat sources may be detected according to principles described herein.

FIG. 9 shows an exemplary configuration 900 of a user premises in which system 100 may be implemented. As shown in FIG. 9, a thermal imaging device 902 is positioned above a room 904 at a user premises so as to capture a plan view thermal image of room 904. A thermal image captured by thermal imaging device 902 may include heat values indicative of persons 906 (e.g., persons 906-1 through 906-3), non-human heat sources 908 (e.g., non-human heat sources 908-1 through 908-3), which correspond, respectively, to a television, a printer, and a laptop computer in the example shown in FIG. 9, and any other objects (e.g., desks, the floor, chairs, etc.) within room 904. System 100 may be configured to process the thermal image captured by thermal imaging device 902 in any suitable manner to determine, for example, how many persons 906 are within room 904 at a given time, locations of persons 906 within room 904, movement of persons 906 within room 904, and/or any other suitable information associated with room 904 to be used for any suitable purpose, such as described herein.

Figure 10:
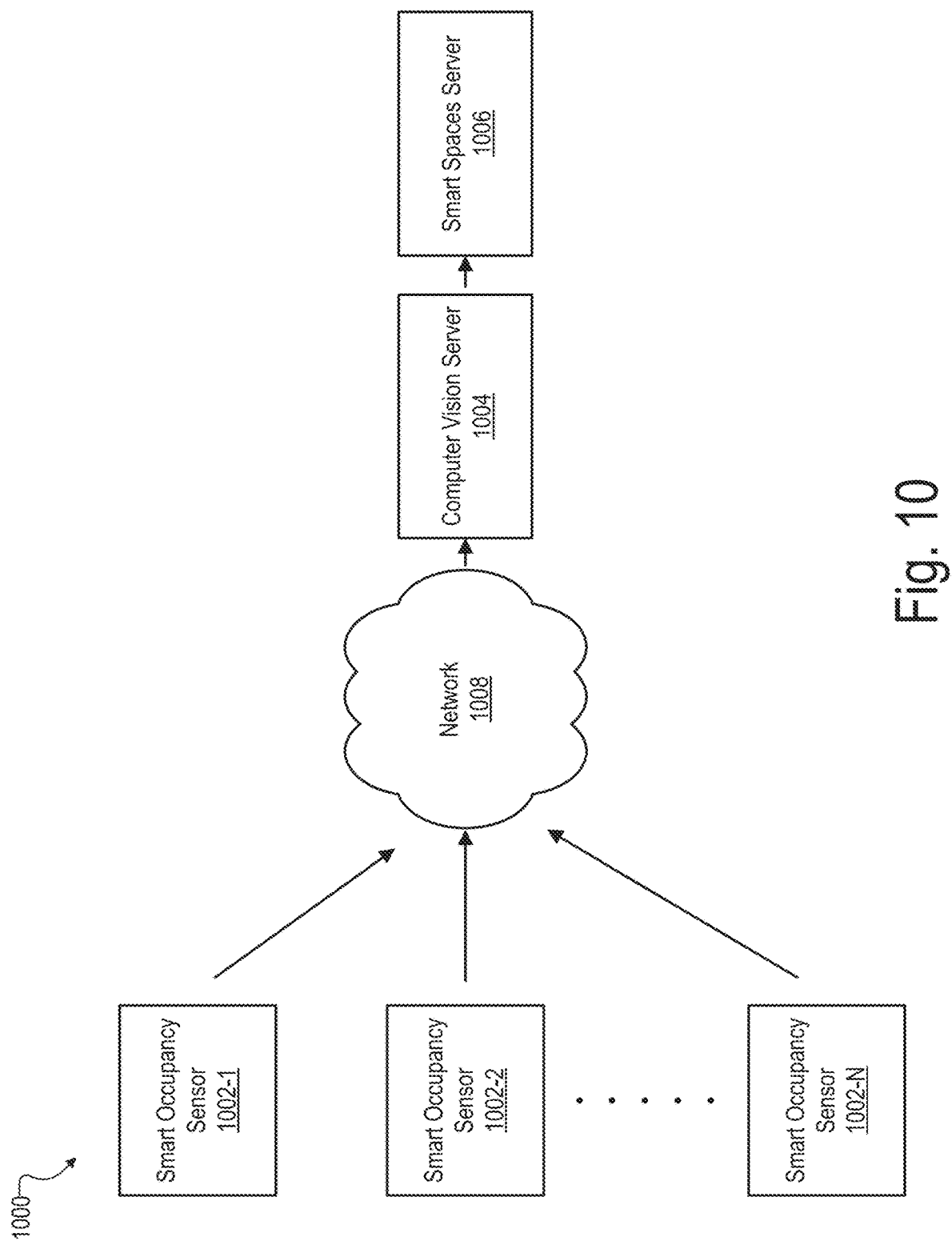
FIGS. 10-11 illustrate additional exemplary configurations within which the tracking system of FIG. 1 may operate according to principles described herein.

FIG. 10 shows another exemplary configuration 1000 in which system 100 may be implemented. As shown in FIG. 10, a plurality of smart occupancy sensors 1002 (e.g., smart occupancy sensors 1002-1 through 1002-N) are communicatively coupled to a computer vision server 1004 and smart spaces server 1006 by way of network 1008. Each smart occupancy sensor 1002 shown in FIG. 10 may include a thermal imaging device (e.g., thermal imaging device 202) and/or a plurality of additional sensors configured to detect information associated with a user premises. For example, each smart occupancy sensor 1002 may include a thermal pixel array camera, a passive infra-red motion detector, a microwave doppler radar sensor, an individual temperature sensor, a humidity sensor, a light intensity sensor, and a microphone configured to detect ambient sound levels at the user premises. In addition, each smart occupancy sensor 1002 may include a microcontroller that is configured to control each of the sensors in each smart occupancy sensor 1002 and a microcontroller configured to operate a secure wireless (e.g., Wi-Fi) communication link.

In the example shown in FIG. 10, each smart occupancy sensor 1002 may be configured to wirelessly stream (e.g., by way of a secure Wi-Fi communication link) data detected by the various sensors to computer vision server 1004.

Computer vision server 1004 may be configured to perform each operation associated with image processing, such as image processing operations described herein, with respect to a thermal image. After computer vision server 1004 performs any suitable processing, computer vision server 1004 may transmit the resulting data (e.g., data representing processed thermal images, one or more heatmap images, locations of detected target heat sources, etc.) to smart spaces server 1006 in any suitable manner and for any suitable purpose.

Smart spaces server 1006 may receive data from computer vision server 1004 and store the data in any suitable manner. In certain examples, smart spaces server 1006 may be configured to analyze the data received from computer vision server 1004 and/or other data associated with a user premises to generate analytics data and/or inferences associated with the user premises. Additionally or alternatively, smart spaces server 1006 may transmit the data received from computer vision server 1004 and/or other data associated with a user premises to another device (e.g., an analytics server) for analysis.

Network 1008 may provide data delivery between smart occupancy sensors 1002, computer vision server 1004, smart spaces server 1006, and/or any other suitable device. In order to distribute the thermal image data and/or any other suitable data, network 1008 may include a provider-specific wired or wireless network (e.g., a cable or satellite carrier network, a mobile telephone network, a traditional telephone network, a broadband cellular data network, etc.), the Internet, a wide area network, a local area network, a content delivery network, and/or any other suitable network or networks. The data may be distributed using any suitable communication technologies implemented or employed by network 1008. Accordingly, the data (e.g., thermal image data) may flow between smart occupancy sensors 1002, computer vision server 1004, smart spaces server 1006, and/or any other suitable device using any communication technologies, devices, media, and protocols as may serve a particular implementation.

System 100 may be implemented by one or more of smart occupancy sensors 1002, computer vision server 1004, and smart spaces server 1006, including by being distributed across smart occupancy sensors 1002, computer vision server 1004, and smart spaces server 1006 in any suitable manner.

Figure 11:
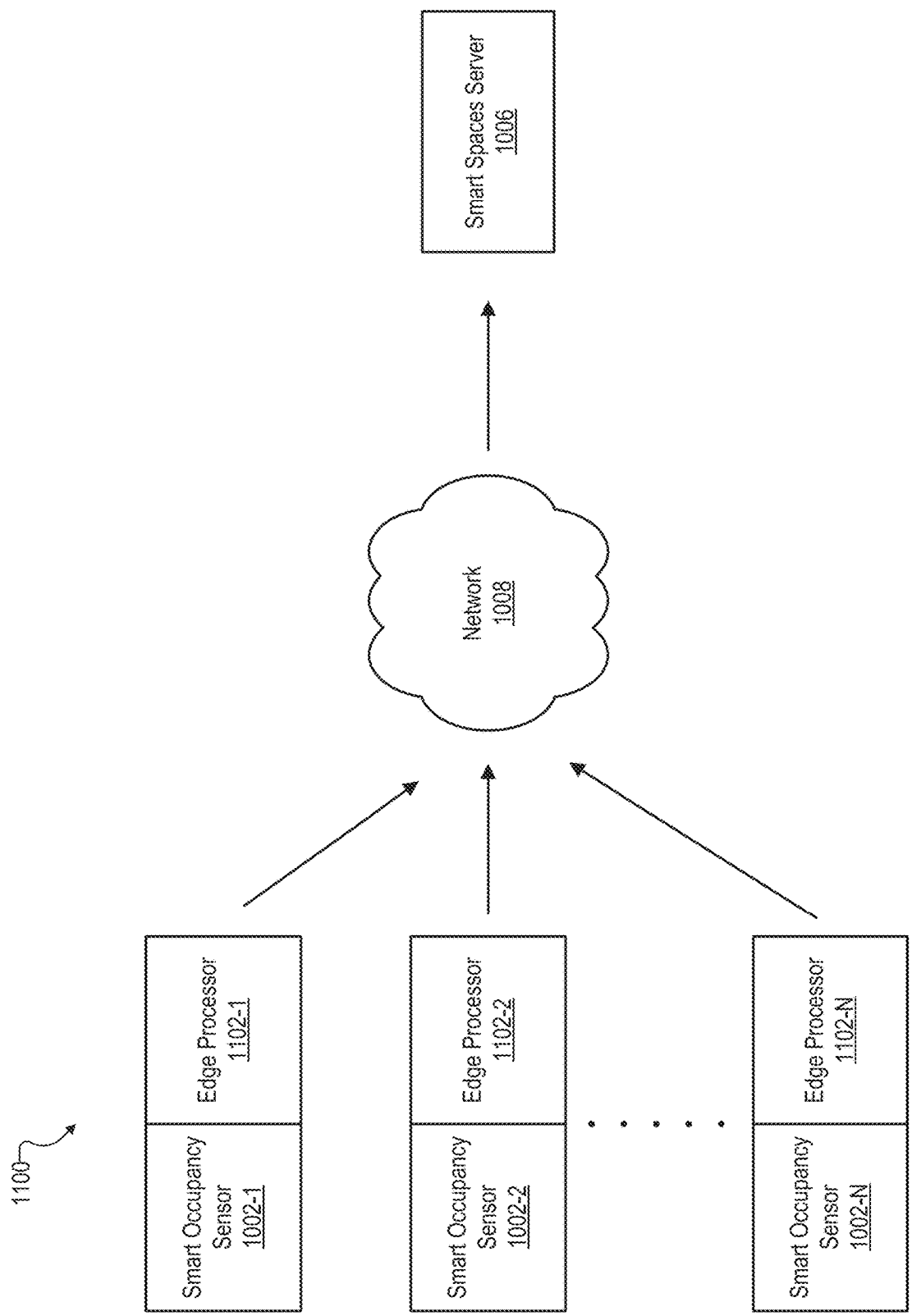

FIG. 11 shows another configuration 1100 in which system 100 may be implemented. Unlike configuration 1000 shown in FIG. 10 where computer vision server 1004 performs certain processing operations, configuration 1100 uses edge network devices where each individual smart occupancy sensor 1002 locally processes thermal image data and performs certain image processing operations described herein. As such, each smart occupancy sensor 1002 shown in FIG. 11 is provided with an edge processor included in a plurality of edge processors 1102 (e.g., edge processors 1102-1 through 1102-N). Each edge processor 1102 is configured to locally process data detected by a respective smart occupancy sensor 1002. Each edge processor 1102 may provide processed data to smart spaces server 1006 for further processing. Edge processors 1102 may be configured to communicate with smart spaces server 1006 using any suitable data communication technologies. In certain examples, smart occupancy sensors 1002 may communicate with smart spaces server 1006 by way of ultra-low latency communication connections that may leverage modern communication technologies such as Multi-access Edge Computing or Mobile Edge Computing ("MEC") technologies, 5G data networking technologies, and so forth to enable computing capabilities at the edge of network 1008.

System 100 may be implemented by one or more of smart occupancy sensors 1002, edge processors 1102, and smart spaces server 1006, including by being distributed across smart occupancy sensors 1002, edge processors 1102, and smart spaces server 1006 in any suitable manner.

Figure 12:
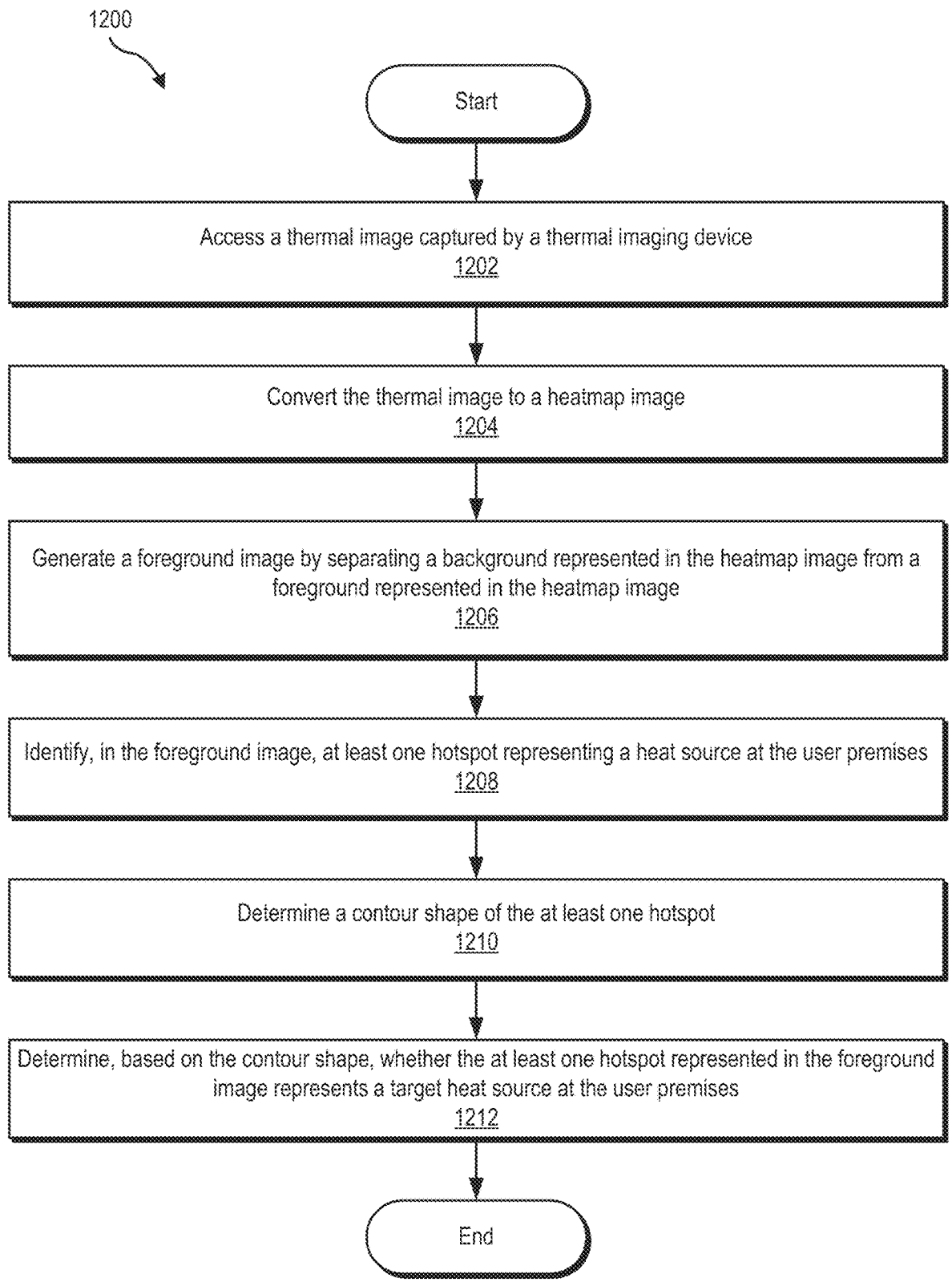
FIGS. 12-13 illustrate exemplary methods for implementing a sensor based real time tracking system according to principles described herein.

FIG. 12 illustrates an exemplary method for implementing a sensor based real time tracking system. While FIG. 12 illustrates exemplary operations according to one embodiment, other embodiments may omit, add to, reorder, and/or modify any of the operations shown in FIG. 12. One or more of the operations shown in FIG. 12 may be performed by system 100, any components included therein, and/or any implementation thereof.

In operation 1202, a tracking system (e.g., system 100) may access a thermal image captured by a thermal imaging device. As described herein, the thermal image includes a plurality of pixels, each pixel included in the plurality of pixels representing a geographic position at a user premises and having a value indicative of a temperature associated with the geographic position. Operation 1202 may be performed in any of the ways described herein.

In operation 1204, the tracking system may convert the thermal image to a heatmap image. Operation 1204 may be performed in any of the ways described herein.

In operation 1206, the tracking system may generate a foreground image by separating a background represented in the heatmap image from a foreground represented in the heatmap image. Operation 1206 may be performed in any of the ways described herein.

In operation 1208, the tracking system may identify, in the foreground image, at least one hotspot representing a heat source at the user premises. Operation 1208 may be performed in any of the ways described herein.

In operation 1210, the tracking system may determine a contour shape of the at least one hotspot. Operation 1210 may be performed an any of the ways described herein.

In operation 1212, the tracking system may determine, based on the contour shape of the at least one hotspot, whether the at least one hotspot represented in the foreground image represents a target heat source at the user premises. Operation 1212 may be performed in any of the ways described herein.

Figure 13:
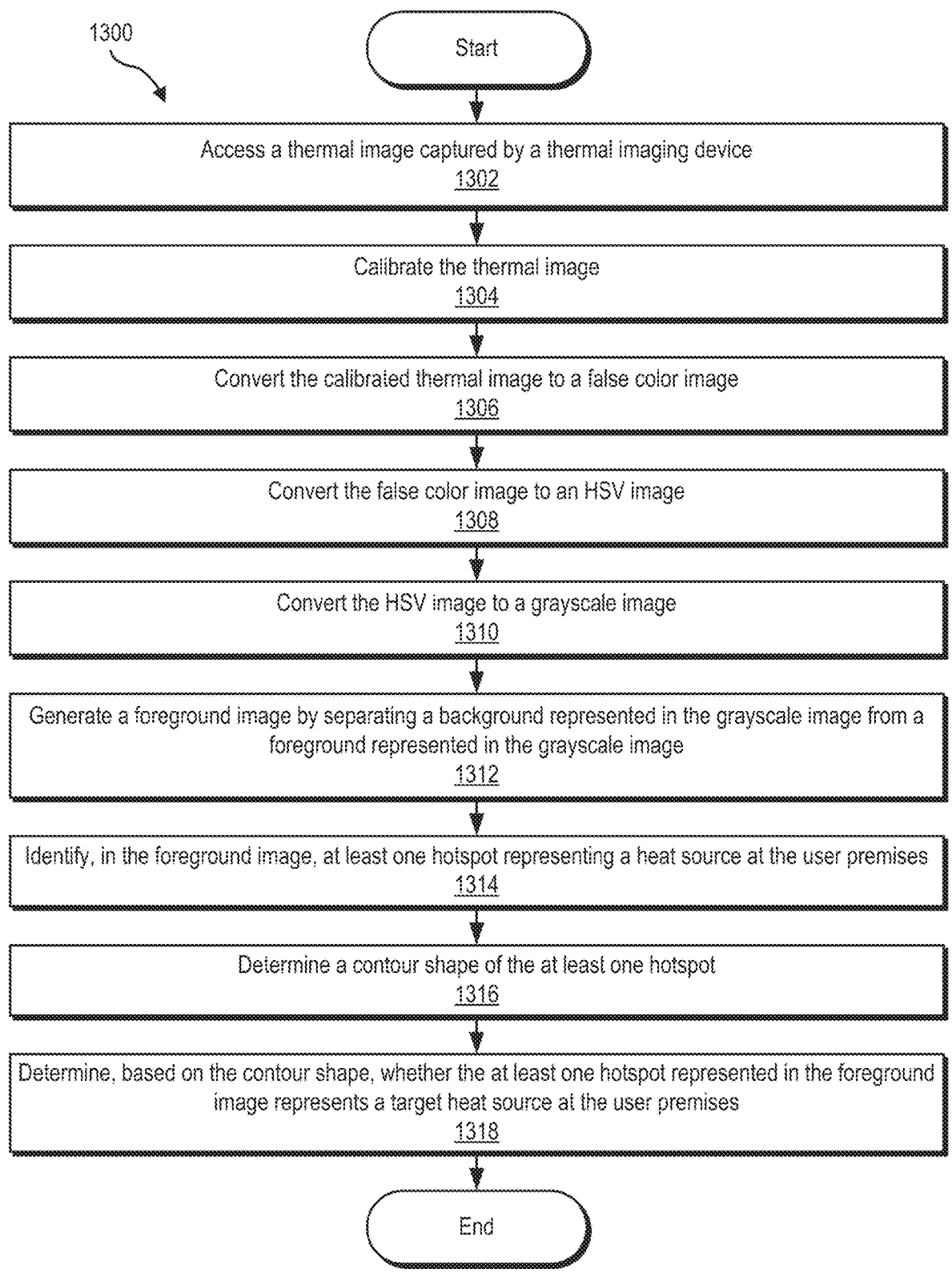

FIG. 13 illustrates another exemplary method for implementing a sensor based real time tracking system. While FIG. 13 illustrates exemplary operations according to one embodiment, other embodiments may omit, add to, reorder, and/or modify any of the operations shown in FIG. 13. One or more of the operations shown in FIG. 13 may be performed by system 100, any components included therein, and/or any implementation thereof.

In operation 1302, a tracking system (e.g., system 100) may access a thermal image captured by a thermal imaging device. As described herein, the thermal image includes a plurality of pixels, each pixel included in the plurality of pixels representing a geographic position at a user premises and having a value indicative of a temperature associated with the geographic position. Operation 1302 may be performed in any of the ways described herein.

In operation 1304, the tracking system may, based on an ambient temperature of the user premises, calibrate the thermal image captured by the thermal imaging device to normalize contrast between a background represented in the thermal image and a foreground represented in the thermal image. Operation 1304 may be performed in any of the ways described herein.

In operation 1306, the tracking system may convert the calibrated thermal image to a false color image. As described herein, in the false color image, the temperature associated with each geographic position at the user premises may be represented by a color selected from a plurality of colors. Operation 1306 may be performed in any of the ways described herein.

In operation 1308, the tracking system may convert the false color image to an HSV image. Operation 1308 may be performed in any of the ways described herein.

In operation 1310, the tracking system may convert the HSV image to a grayscale image. Operation 1310 may be performed in any of the ways described herein.

In operation 1312, the tracking system may generate a foreground image by separating a background represented in the grayscale image from a foreground represented in the grayscale image. Operation 1312 may be performed in any of the ways described herein.

In operation 1314, the tracking system may identify, in the foreground image, at least one hotspot representing a heat source at the user premises. Operation 1314 may be performed in any of the ways described herein.

In operation 1316, the tracking system may determine a contour shape of the at least one hotspot. Operation 1316 may be performed in any of the ways described herein.

In operation 1318, the tracking system may determine, based on the contour shape of the at least one hotspot, whether the at least one hotspot represented in the foreground image represents a target heat source at the user premises. Operation 1318 may be performed in any of the ways described herein.

In addition to detecting heat sources at a user premises, systems and methods such as those described herein may be utilized in any suitable manner to facilitate optimizing utilization of a user premises and/or human comfort levels associated with the user premises.

To that end, in certain examples, the systems and methods described herein may be part of or used in conjunction with a smart spaces system that is configured to determine a human comfort index associated with a user premises and optimize utilization of the user premises. As used herein, a "human comfort index" is a measurement of how comfortable it is for a person to occupy a user premises (e.g., a room at the user premises). The human comfort index may be determined based on any one or more of a plurality of parameters associated with the user premises. Such parameters may include, for example, an ambient temperature of the user premises, the humidity of the user premises, a heat index (a combined measure of temperature and humidity, which represents a heat level as perceived by humans) of the user premises, a size of the user premises (e.g., a size of a room), an occupancy level at the user premises (e.g., occupancy density such as the number of people per square meter), the time of day, the month/season, a background sound level at the user premises, a light level at the user premises, and/or any other suitable parameter. Such parameters may be detected by any suitable sensor provided as part of a smart occupancy sensor (e.g., smart occupancy sensor 1002-1). In certain examples, systems and methods such as those described herein may be used to continuously track ambient temperature, relative humidity, heat index, and/or any other suitable attribute of a user premises.

Parameters such as those described herein may be analyzed in any suitable manner to gain insights associated with usage of the user premises. Such insights may provide information regarding floor occupancy patterns, daily and seasonal variations of room utilization, human occupancy of a user premises during an emergency (e.g., a fire, an active shooter situation, an earthquake, etc.), space usage indicating whether the user premises has overcrowded or sparsely used areas, utilization patterns of different areas of a user premises (e.g., the kitchen, breakroom, etc.), crowd movement patterns in and out of the user premises, temperature and/or humidity maps of the user premises, indoor lighting levels at different times of the day/night, sound levels at the user premises, etc.

Parameters such as those described above may be analyzed and/or combined in any suitable manner to determine a human comfort index associated with a user premises. In certain examples, the smart spaces system may utilize a fuzzy logic algorithm to compute the human comfort index associated with a user premises. Such a fuzzy logic algorithm is used to define fuzzy membership sets and may include the following operations.

Define fuzzy variables that impact the human comfort index. Such fuzzy variables may include, for example, the room size, the number of occupants in the room, the time of day, the season, the environmental temperature, the humidity, etc.

Create membership functions for the defined fuzzy variables over subjective ranges. Such membership functions may have any suitable shape (e.g., triangular, square, trapezoidal, Gaussian, etc.) as may serve a particular implementation.

Map raw input data to linguistic variables such that the fuzzy variables get activated against the membership function. Examples of linguistic variables may include hot, warm, neutral, cold, very cold, etc.

Pass the activated input through a set of fuzzy rules, which results in a fuzzy output variable.

De-fuzzify the outcome so that it forms a human-interpretable crisp action variable.

Store the outcome in any suitable database (e.g., a database at smart spaces server 1006).

Figure 15:
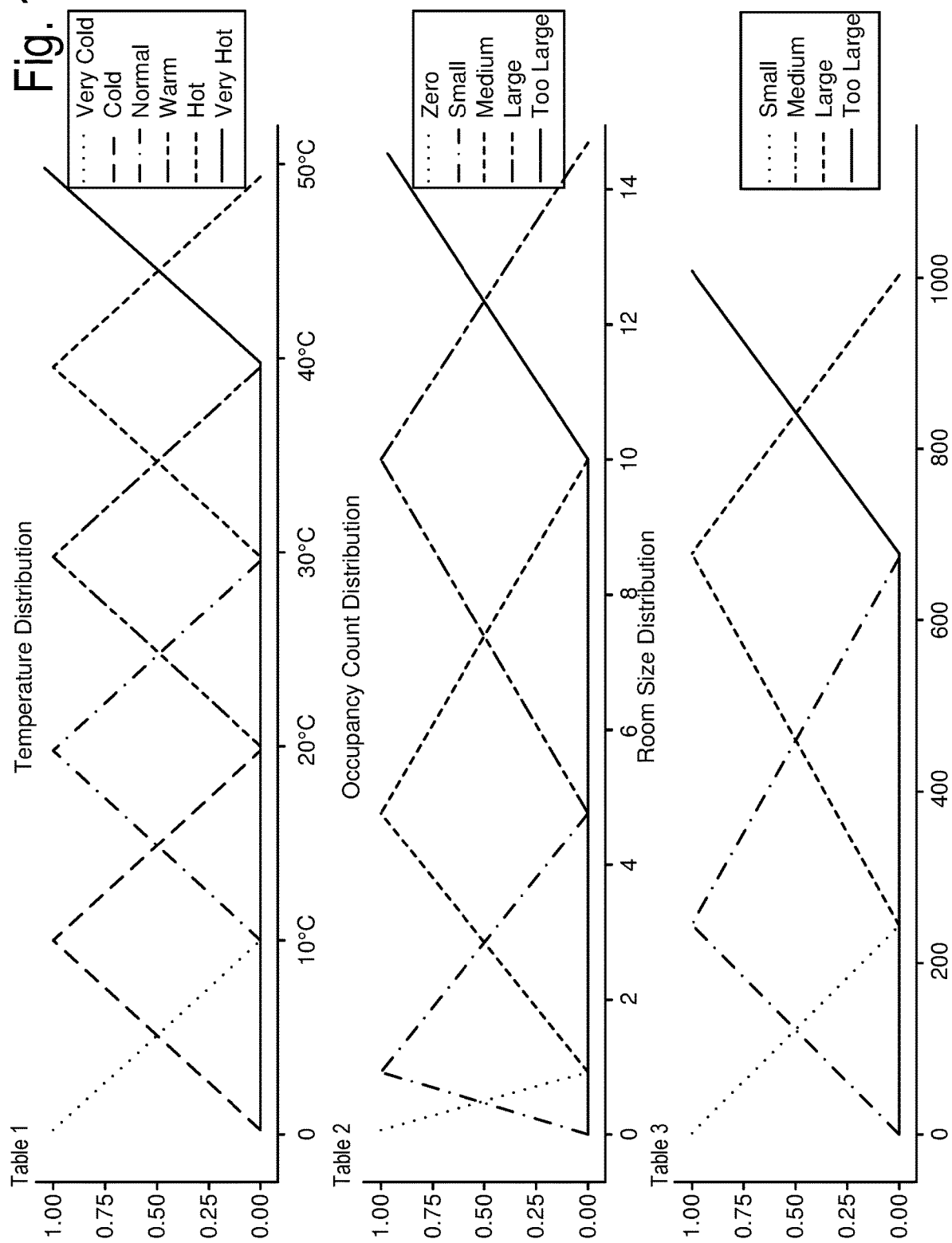
FIG. 15 illustrates exemplary tables depicting fuzzy membership sets that may be utilized according to principles described herein.

FIG. 15 depicts exemplary tables 1-3 that illustrate exemplary fuzzy membership sets that may be utilized according to principles described herein to determine the human comfort index.

The human comfort index (e.g., the outcome of the fuzzy logic algorithm) may be used for any suitable purpose as may serve a particular implementation. In certain examples, the human comfort index may be provided for display in any suitable manner to the user so that the user can take any suitable action to adjust the environment associated with the user premises and improve the human comfort index. For example, the smart spaces system may determine either through the fuzzy logic algorithm set forth above or in any other suitable manner that the user premises is uncomfortably warm. Based on such a determination, the user may be prompted to set the thermostat at the user premises to a lower temperature.

In certain examples, the smart spaces system may automatically (e.g., without requiring additional input from a user) perform an operation based on a determined human comfort index. For example, the smart spaces system may automatically adjust operation of HVAC equipment based on a determined human comfort index.

In certain examples, systems and methods such as those described herein may be used to measure people density at a user premises (e.g., people density in a retail space). The measured people density may be used in any suitable manner to optimize usage of the user premises and/or human comfort levels. For example, systems such as those described herein may be used to determine that the people density within a given room at a user premises is consistently above a certain threshold, which makes occupying that room uncomfortable. Based on such a determination, the smart spaces system may prompt a user to take action to reduce the people density in that room. For example, entry to that room may be limited in any suitable manner to reduce the people density. Alternatively, a different larger room at the user premises may be utilized instead of that particular room.

In certain examples, systems and methods such as those described herein may be used to generate and/or modify a heatspot map of a user premises. In certain examples, the heatspot map may illustrate both stationary and mobile heat sources at a user premises. For example, a printer located in a room of a user premises may be considered as a stationary heat source whereas a person located in the room may be considered as a mobile heat source. In certain examples, the heatspot map may show average human body temperatures at the user premises. Such a heatspot map may be used for any suitable purpose, such as described herein, to facilitate detecting target heat sources at a user premises.

In certain examples, systems and methods such as those described herein may be used to monitor temperature changes associated with equipment located at a user premises to detect potential emergency situations. For example, the smart spaces system may determine based on a thermal image of a user premises that there has been an abnormal increase in temperature behind electrical panels at a user premises. Such an abnormal increase in temperature may be indicative of a fire or some other malfunction of the equipment behind the electrical panels. Accordingly, the smart spaces system may analyze thermal image data and determine that there is either a fire or a potential fire hazard associated with the equipment and may automatically trigger an early fire alarm.

In certain examples, systems and methods such as those described herein may be used to monitor a light level at a user premises and/or luminance of electric lighting fixtures. Such information may be used in any suitable manner to optimize the light level at the user premises and improve human comfort levels at the user premises. For example, the smart spaces system may determine that a light level at a user premises is above a predetermined threshold, which makes the user premises uncomfortable to occupy. Accordingly, the smart spaces system may automatically dim the lights and/or take any other suitable action to reduce the light level.

In certain examples, systems and methods such as those described herein may be used to monitor background noise levels (e.g., equipment noise, machine tool noise, voice noise, etc.) at a user premises. Information associated with the background noise levels may be used in any suitable manner to improve the human comfort index associated with a user premises. For example, the smart spaces system may determine that a background noise level at a user premises is consistently above a predefined threshold, which makes it uncomfortable to occupy the user premises. Based on such a determination, the smart spaces system may take any suitable action to facilitate reducing the background noise level.

In certain examples, the smart spaces system may utilize any information detected by a smart occupancy sensor to provide real-time instructions to persons at a user premises. For example, the smart spaces system may provide real time guidance to a person at a user premises during an emergency. To illustrate, a smart spaces system may determine that there is a fire at the user premises. The smart spaces system may leverage one or more thermal imaging devices (e.g., thermal imaging devices 202) and analyze thermal image data, such as described herein, to determine where the fire is located at the user premises. The smart spaces system may then determine an optimal route to exit the user premises and may provide real-time instructions, in any suitable manner, to persons at the user premises to help them avoid the fire and safely exit the user premises.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 14:
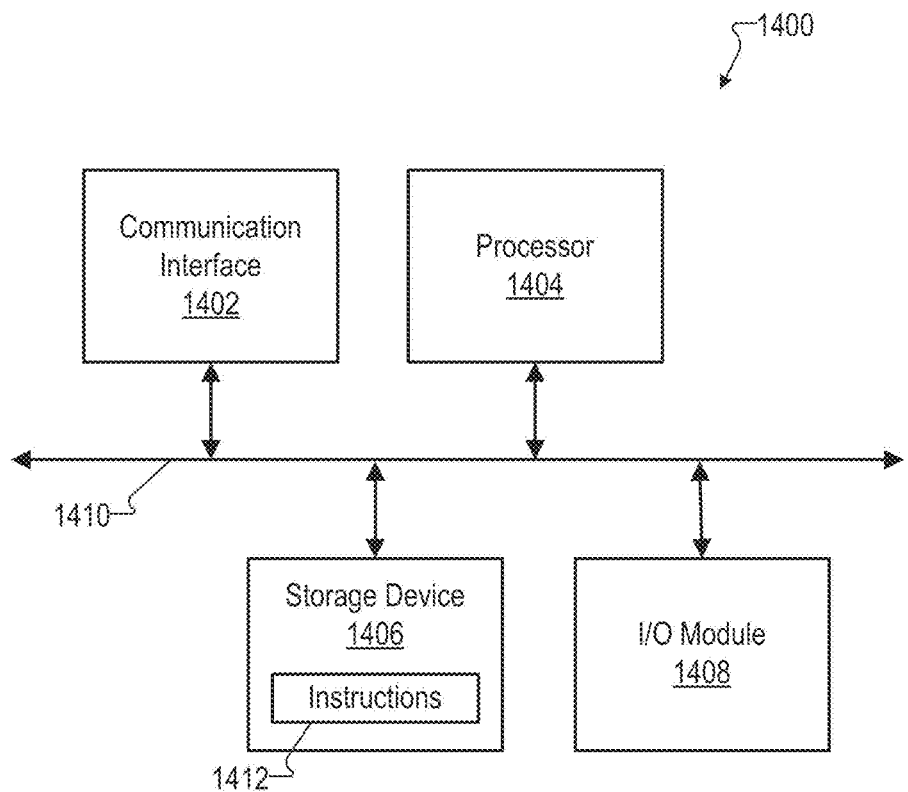
FIG. 14 illustrates an exemplary computing device according to principles described herein.

FIG. 14 illustrates an exemplary computing device 1400 that may be specifically configured to perform one or more of the processes described herein. As shown in FIG. 14, computing device 1400 may include a communication interface 1402, a processor 1404, a storage device 1406, and an input/output ("I/O") module 1408 communicatively connected to one another via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data and/or interpreting, executing, and/or directing execution of one or more of the instructions, processes, and/or operations described herein. Processor 1404 may perform operations by executing computer-executable instructions 1412 (e.g., an application, software, code, and/or other executable data instance) stored in storage device 1406.

Storage device 1406 may include one or more data storage media, devices, or configurations and may employ any type, form, and combination of data storage media and/or device. For example, storage device 1406 may include, but is not limited to, any combination of the non-volatile media and/or volatile media described herein. Electronic data, including data described herein, may be temporarily and/or permanently stored in storage device 1406. For example, data representative of computer-executable instructions 1412 configured to direct processor 1404 to perform any of the operations described herein may be stored within storage device 1406. In some examples, data may be arranged in one or more databases residing within storage device 1406.

I/O module 1408 may include one or more I/O modules configured to receive user input and provide user output. One or more I/O modules may be used to receive input for a single virtual experience. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1400. For example, storage facility 102 may be implemented by storage device 1406, and processing facility 104 may be implemented by processor 1404.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a memory that stores instructions;
a processor communicatively coupled to the memory and configured to execute the instructions to:
access a thermal image captured by a thermal imaging device, the thermal image including a plurality of pixels, each pixel included in the plurality of pixels representing a geographic position at a user premises and having a value indicative of a temperature associated with the geographic position;
convert the thermal image to a heatmap image;
generate a foreground image by separating a background represented in the heatmap image from a foreground represented in the heatmap image;
identify, in the foreground image, at least one hotspot representing a heat source located at the user premises;
determine a contour shape of the at least one hotspot; and
determine, based on the contour shape of the at least one hotspot, whether the at least one hotspot represented in the foreground image represents a target heat source located at the user premises.

2. The system of claim 1, wherein the converting of the thermal image to the heatmap image comprises:
converting the thermal image to a false color image in which the temperature associated with each geographic position at the user premises is represented by a color selected from a plurality of colors;
converting the false color image to a Hue, Saturation, Value ("HSV") image; and
converting the HSV image to a grayscale image.

3. The system of claim 2, wherein the processor is further configured to execute the instructions to increase resolution of the false color image prior to converting the false color image to the HSV image.

4. The system of claim 2, wherein the processor is further configured to execute the instructions to adjust at least one of intensity and contrast of the grayscale image prior to generating the foreground image.

5. The system of claim 2, wherein the processor is further configured to execute the instructions to perform an image blurring operation on the grayscale image prior to generating the foreground image.

6. The system of claim 1, wherein the processor is further configured to execute the instructions to calibrate, based on an ambient temperature of the user premises, the thermal image captured by the thermal imaging device to normalize contrast between a background represented in the thermal image and a foreground represented in the thermal image.

7. The system of claim 1, wherein:
the identifying of the at least one hotspot in the foreground image includes identifying a plurality of hotspots representing the heat source; and
the processor is further configured to execute the instructions to combine the plurality of hotspots represented in the foreground image to form a single hotspot that is representative of the heat source located at the user premises.

8. The system of claim 1, wherein:
the generating of the foreground image includes:
executing a plurality of separation algorithms to separate the foreground from the background; and
selecting an image formed as a result of executing at least one separation algorithm included in the plurality of separation algorithms to use as the foreground image.

9. The system of claim 1, wherein:
the target heat source corresponds to a person located at the user premises; and
the processor is further configured to execute the instructions to determine how many persons are currently located at the user premises based on the foreground image.

10. The system of claim 1, wherein:
the identifying of the at least one hotspot in the foreground image includes identifying a plurality of hotspots representing a plurality of heat sources; and
the processor is further configured to execute the instructions to:

determine a location of a particular hotspot included in the plurality of hotspots in relation to the user premises;

access a database that includes information identifying one or more non-human heat sources located at the user premises, a contour shape of each of the one or more non-human heat sources, and a location of each of the one or more non-human heat sources at the user premises;

determine that the particular hotspot represents one of the one or more non-human heat sources when
- a contour shape of the particular hotspot matches the contour shape of the one of the one or more non-human heat sources included in the database, and
- a location of the particular hotspot at the user premises matches the location of the one of the one or more non-human heat sources at the user premises included in the database; and exclude the particular hotspot from the foreground image when it is determined that the particular hotspot represents the one of the one or more non-human heat sources.

11. The system of claim 1, wherein the processor is further configured to execute the instructions to:
access an additional thermal image captured by the thermal imaging device;
convert the additional thermal image to an additional heatmap image;
generate an additional foreground image by separating a background represented in the additional heatmap image from a foreground represented in the additional heatmap image;
identify, in the additional foreground image, at least one additional hotspot;
determine a contour shape of the at least one additional hotspot; and
compare the foreground image to the additional foreground image to determine whether the at least one additional hotspot represented in the additional foreground image represents the target heat source at the user premises.

12. The system of claim 1, wherein the processor is further configured to execute the instructions to determine a human comfort index associated with the user premises based on the thermal image captured by the thermal imaging device.

13. A system comprising:
a memory that stores instructions;
a processor communicatively coupled to the memory and configured to execute the instructions to:
access a thermal image captured by a thermal imaging device, the thermal image including a plurality of pixels, each pixel included in the plurality of pixels representing a geographic position at a user premises and having a value indicative of a temperature associated with the geographic position;
calibrate, based on an ambient temperature of the user premises, the thermal image captured by the thermal imaging device to normalize contrast between a background represented in the thermal image and a foreground represented in the thermal image;
convert the thermal image to a false color image in which the temperature associated with each geographic position at the user premises is represented by a color selected from a plurality of colors;
convert the false color image to a Hue, Saturation, Value ("HSV") image;
convert the HSV image to a grayscale image;
generate a foreground image by separating a background represented in the grayscale image from a foreground represented in the grayscale image;
identify, in the foreground image, at least one hotspot representing the heat source located at the user premises;
determine a contour shape of the at least one hotspot; and
determine, based on the contour shape of the at least one hotspot, whether the at least one hotspot represented in the foreground image represents a target heat source at the user premises.

14. The system of claim 13, wherein the processor is further configured to execute the instructions to increase resolution of the false color image prior to converting the false color image to the HSV image.

15. The system of claim 13, wherein the processor is further configured to execute the instructions to adjust at least one of intensity and contrast of the grayscale image prior to generating the foreground image.

16. A method comprising:
accessing, by a tracking system, a thermal image captured by a thermal imaging device, the thermal image including a plurality of pixels, each pixel included in the plurality of pixels representing a geographic position at a user premises and having a value indicative of a temperature associated with the geographic position;
converting, by the tracking system, the thermal image to a heatmap image;
generating, by the tracking system, a foreground image by separating a background represented in the heatmap image from a foreground represented in the heatmap image;
identifying, in the foreground image by the tracking system, at least one hotspot representing a heat source at the user premises;
determining, by the tracking system, a contour shape of the at least one hotspot; and
determining, by the tracking system and based on the contour shape of the at least one hotspot, whether the at least one hotspot represented in the foreground image represents a target heat source at the user premises.

17. The method of claim 16, wherein the converting of the thermal image to the heatmap image comprises:
converting the thermal image to a false color image in which the temperature associated with each geographic position at the user premises is represented by a color selected from a plurality of colors;
converting the false color image to a Hue, Saturation, Value ("HSV") image; and
converting the HSV image to a grayscale image.

18. The method of claim 17, further comprising increasing, by the tracking system, resolution of the false color image prior to the converting of the false color image to the HSV image.

19. The method of claim 17, further comprising adjusting, by the tracking system, at least one of intensity and contrast of the grayscale image prior to generating the foreground image.

20. The method of claim 16, further comprising calibrating, by the tracking system and based on an ambient temperature of the user premises, the thermal image captured by the thermal imaging device to normalize contrast between a background represented in the thermal image and a foreground represented in the thermal image.

\* \* \* \* \*